(12) United States Patent
Willkens et al.

(10) Patent No.: US 9,951,952 B2
(45) Date of Patent: Apr. 24, 2018

(54) HOT SURFACE IGNITERS AND METHODS OF MAKING SAME

(71) Applicant: Specialized Component Parts Limited, Inc., Auburn, IN (US)

(72) Inventors: Craig Andrew Willkens, Auburn, IN (US); Frederick Taylor Fernandez, Fort Wayne, IN (US)

(73) Assignee: Specialized Component Parts Limited, Inc., Auburn, IN (US)

( * ) Notice: Subject to any disclaimer, the term of this patent is extended or adjusted under 35 U.S.C. 154(b) by 437 days.

(21) Appl. No.: 14/514,506

(22) Filed: Oct. 15, 2014

(65) Prior Publication Data
US 2016/0109125 A1    Apr. 21, 2016

(51) Int. Cl.
*F23Q 7/00* (2006.01)
*F27D 7/06* (2006.01)
(Continued)

(52) U.S. Cl.
CPC ............ *F23Q 7/001* (2013.01); *C04B 35/573* (2013.01); *C04B 35/64* (2013.01); *F23Q 7/00* (2013.01); *F27D 7/06* (2013.01); *F27D 19/00* (2013.01); *C04B 2235/3217* (2013.01); *C04B 2235/3272* (2013.01); *C04B 2235/3826* (2013.01); *C04B 2235/5436* (2013.01); *C04B 2235/5472* (2013.01); *C04B 2235/608* (2013.01); *C04B 2235/652* (2013.01); *C04B 2235/658* (2013.01); *C04B 2235/6562* (2013.01); *C04B 2235/6565* (2013.01); *C04B 2235/6567* (2013.01); *C04B 2235/661* (2013.01); *C04B 2235/72* (2013.01); *C04B 2235/722* (2013.01);
(Continued)

(58) Field of Classification Search
CPC ......... F23Q 7/00; F23Q 7/22; F23Q 2007/004
USPC ................................ 219/260, 270, 267, 276
See application file for complete search history.

(56) References Cited

U.S. PATENT DOCUMENTS 2,095,253 A    10/1937  Heyroth
2,993,111 A     7/1961  Schrewelius et al.
(Continued)

FOREIGN PATENT DOCUMENTS

CA    2025862 A1    3/1991
CA    2311181 A1    1/2001
(Continued)

OTHER PUBLICATIONS

International Search Report and Written Opinion dated Dec. 31, 2015.
(Continued)

*Primary Examiner* — Dana Ross
*Assistant Examiner* — Ayub Maye
(74) *Attorney, Agent, or Firm* — Hansen IP Law PLLC

(57) ABSTRACT

A method of making a hot surface igniter is described. A silicon carbide composition that includes both fines fraction and a coarse fraction is sintered in a nitrogen and argon reducing atmosphere in a manner that controls the incorporation of nitrogen with in the lattice of recrystallized silicon carbide. The controlled incorporation of nitrogen in the lattice provides enhanced control over heating and electrical properties, while simultaneously achieving a lower surface area fully recrystallized structure for oxidation resistance and long service life.

40 Claims, 11 Drawing Sheets

(51) Int. Cl.
*F27D 19/00* (2006.01)
*C04B 35/573* (2006.01)
*C04B 35/64* (2006.01)
*H01C 17/065* (2006.01)

(52) U.S. Cl.
CPC ...... *C04B 2235/75* (2013.01); *C04B 2235/94* (2013.01); *F23Q 2007/004* (2013.01); *F27D 2007/063* (2013.01); *F27D 2019/0003* (2013.01); *F27D 2019/0006* (2013.01); *H01C 17/0652* (2013.01); *H01C 17/06533* (2013.01)

(56) References Cited

U.S. PATENT DOCUMENTS

| | | | |
|---|---|---|---|
| 3,151,994 | A | 10/1964 | Adlassnig |
| 3,842,319 | A | 10/1974 | Perl |
| 3,853,566 | A † | 12/1974 | Prochazka |
| 3,875,477 | A † | 4/1975 | Fredriksson |
| 4,004,934 | A | 1/1977 | Prochazka |
| 4,040,848 | A | 8/1977 | Greskovich et al. |
| 4,040,849 | A | 8/1977 | Greskovich et al. |
| 4,174,971 | A | 11/1979 | Schrewelius |
| 4,209,474 | A † | 6/1980 | Prochazka |
| 4,237,085 | A | 12/1980 | Smoak |
| 4,238,434 | A | 12/1980 | Enomoto et al. |
| 4,302,508 | A | 11/1981 | Hierholzer, Jr. et al. |
| 4,312,954 | A † | 1/1982 | Coppola |
| 4,506,021 | A | 3/1985 | Jack et al. |
| 4,540,673 | A | 9/1985 | Takeda et al. |
| 4,668,452 | A | 5/1987 | Watanabe et al. |
| 4,863,657 | A | 9/1989 | Tanaka et al. |
| 5,139,719 | A | 8/1992 | Winder |
| 5,283,019 | A | 2/1994 | Atwell et al. |
| 5,348,694 | A | 9/1994 | Goldberger |
| 5,389,586 | A | 2/1995 | Rogers et al. |
| 5,656,561 | A | 8/1997 | Rogers et al. |
| 5,665,663 | A | 9/1997 | Kishi |
| 5,702,997 | A † | 12/1997 | Dynan |
| 5,718,866 | A | 2/1998 | Richter et al. |
| 5,786,565 | A | 7/1998 | Willkens et al. |
| 6,017,485 | A | 1/2000 | Enck et al. |
| 6,028,292 | A | 2/2000 | Willkens et al. |
| 6,187,256 | B1 * | 2/2001 | Aslan ............ C04B 35/565 252/504 |
| 6,278,087 | B1 | 2/2001 | Willkens et al. |
| 6,197,247 | B1 | 3/2001 | Rodriguez et al. |
| 6,297,183 | B1 † | 10/2001 | Willkens |
| 6,562,745 | B2 | 5/2003 | Willkens et al. |
| 6,759,624 | B2 * | 7/2004 | Kumar ............ H01J 37/32009 219/121.36 |
| 6,933,471 | B2 | 8/2005 | Hamel et al. |
| 7,005,612 | B2 | 2/2006 | Han |
| 7,067,085 | B1 | 6/2006 | Sugawara et al. |
| 7,150,850 | B2 | 12/2006 | Okada |
| 7,332,690 | B2 | 2/2008 | Schmiedlin et al. |
| 7,342,201 | B1 | 3/2008 | Heuberger et al. |
| 7,538,297 | B2 | 5/2009 | Anderson et al. |
| 7,671,305 | B2 | 3/2010 | Chodacki et al. |
| 7,675,005 | B2 | 3/2010 | Annavarapu et al. |
| 7,759,618 | B2 * | 7/2010 | Beatson ............ H05B 3/148 216/101 |
| 7,772,525 | B2 | 8/2010 | Annavarapu et al. |
| 7,785,482 | B2 | 8/2010 | Subramanian et al. |
| 7,786,409 | B2 | 8/2010 | Hamel et al. |
| 8,133,430 | B2 * | 3/2012 | Colopy ............ C04B 35/571 264/625 |
| 8,158,909 | B2 | 4/2012 | England et al. |
| 8,434,292 | B2 * | 5/2013 | Eason ............ F02C 7/266 431/66 |
| 8,678,270 | B2 * | 3/2014 | England ............ F23Q 7/22 228/122.1 |
| 2002/0010067 | A1 | 1/2002 | Willkens et al. |
| 2007/0295708 | A1 | 12/2007 | Yu et al. |
| 2007/0295709 | A1 | 12/2007 | Willkens |
| 2008/0023461 | A1 | 1/2008 | Anderson et al. |
| 2008/0265471 | A1 | 10/2008 | Colopy |
| 2009/0179023 | A1 | 7/2009 | Annavarapu et al. |
| 2011/0148011 | A1 | 6/2011 | Colopy |
| 2011/0253696 | A1 † | 10/2011 | Hanagan |
| 2016/0109125 | A1 † | 4/2016 | Willkens |

FOREIGN PATENT DOCUMENTS

| | | |
|---|---|---|
| CA | 2311181 C | 1/2005 |
| CA | 2660573 A1 | 2/2008 |
| EP | 0419271 A2 | 3/1991 |
| GB | 834739 A | 5/1960 |
| JP | 605071 A | 1/1985 |
| JP | 07215781 A | 8/1995 |
| JP | 2000302573 A | 10/2000 |
| JP | 2012526355 A | 10/2012 |
| WO | 03075613 A1 | 9/2003 |
| WO | 2007056739 A2 | 5/2007 |

OTHER PUBLICATIONS

English Machine Translation of JP07215781A from Lexis Nexis Total Patent.
English Machine Translation of JP2000302573A from Lexis Nexis Total Patent.
English Machine Translation of JP2012526355A from Lexis Nexis Total Patent.
Schwetz, Hanbook of Ceramic Hard Materials, Chapter 5: Silicon Carbide Based Hard Materials, 2000, pp. 683, 700, 719 and 720, available at http://onlinelibrary.wiley.com/doi/10.1002/9783527618217.ch20/summary.†
Telle, R., Materials Science and Technology, Sep. 15, 2006, Chapter 4, Boride and Carbide Ceramics, pp. 173-174, 226 and 227, available at http://onlinelibrary.wiley.com/doi/10.1002/9783527603978.mst0120/full.†
Schwetz, Handbook of Ceramic Hard Materials, Chapter 5: Silicon Carbide Based Hard Materials, 2000, pp. 683, 700, 719 and 720, available at http://onlinelibrary.wiley.com/doi/10.1002/9783527618217.ch20/summary.†

\* cited by examiner
† cited by third party

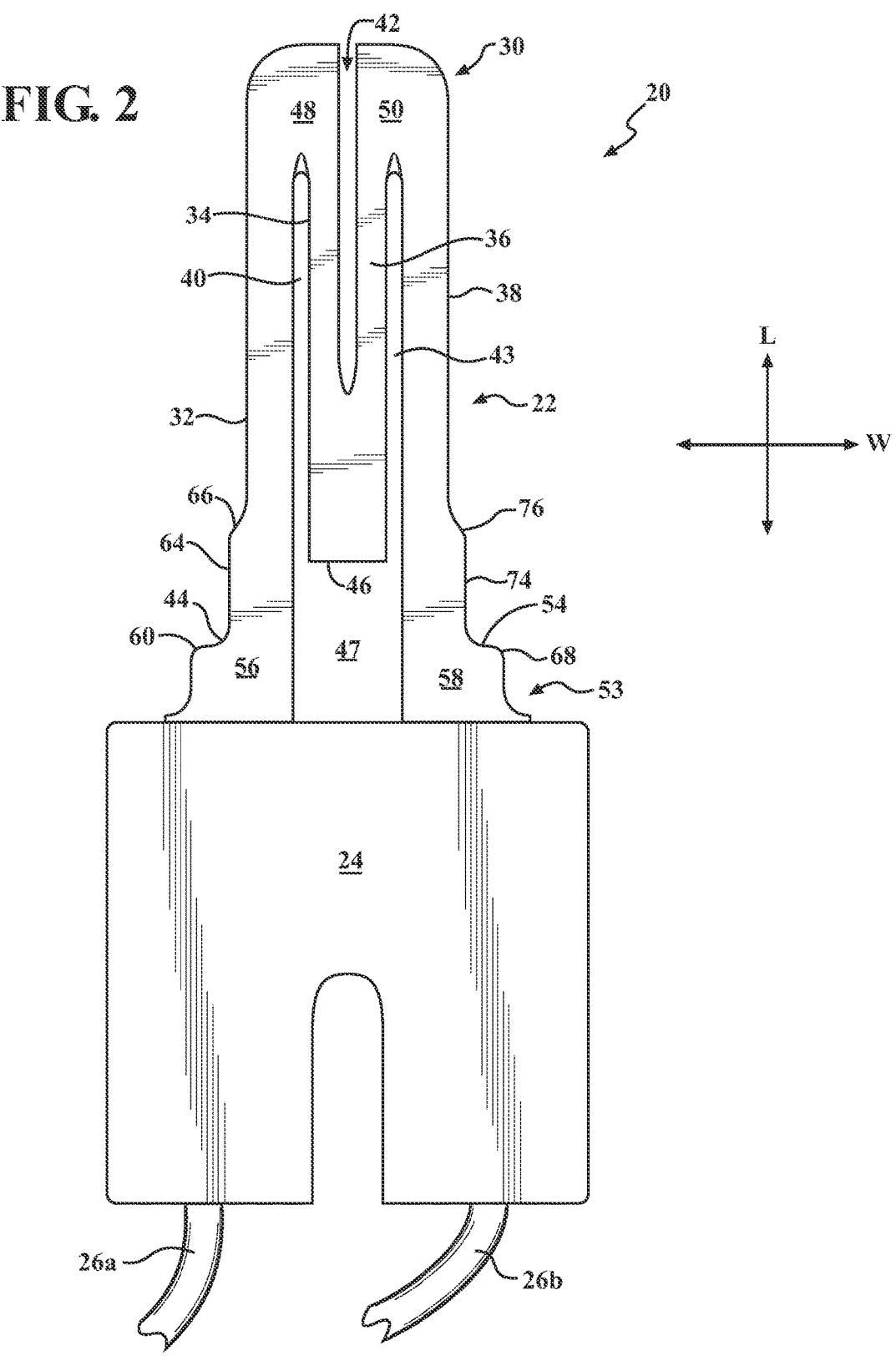

HOT SURFACE IGNITERS AND METHODS OF MAKING SAME

FIELD

This disclosure relates to hot surface igniters, and in particular, methods of making hot surface igniters by recrystallizing silicon carbide fines in a reducing atmosphere.

BACKGROUND

Hot surface igniters are used to ignite combustion gases in a variety of domestic and industrial appliances, including furnaces, kitchen ranges, and clothing dryers. The igniters typically include a semi-conductive ceramic body with terminal ends across which a potential difference is applied. Current flowing through the ceramic body causes the body to heat up and increase in temperature, providing a source of ignition for combustion gases.

When in service, igniters are typically subject to variable line voltages. Igniters are typically specified to achieve a certain minimum temperature at a minimum expected voltage ($T_{Vmin}$) within a specified period of time and not to exceed a certain maximum temperature at the maximum line voltage ($T_{Vmax}$). The nominal line voltage that is typically expected to be encountered lies between the minimum and the maximum, and it is often preferred that when operating at the nominal line voltage, the igniter temperature is as close to $T_{Vmin}$ as possible, while still exceeding it. For example, in the United States, the nominal line voltage to appliances such as a gas range and a residential furnace is 120V, maximum line voltage is 132V and minimum expected voltage is 102V.

A key property of hot surface igniters is their resistivity, which is an intrinsic property of the igniter material:

$$\rho = R(A/L) \quad (1)$$

where, $\rho$=resistivity (ohm-cm)
R=resistance (ohms)
L=length (cm)
A=cross-sectional area (cm$^2$)

As equation (1) indicates, the length and cross-sectional area can be varied in forming an igniter body out of a given material to obtain a desired resistance. Resistivity is temperature dependent. Thus, a given igniter material will typically exhibit a different resistivity at room temperature and at the service temperature of the igniter (high temperature resistivity).

The ratio of room temperature resistivity to high temperature resistivity is an important igniter property for several reasons. First, if the ratio is too high or low, then room temperature performance will not be a good indicator of high temperature performance. Apart from the ratio, if the room temperature resistivity is too low, the igniter will reach $T_{Vmax}$ at a voltage that is less than the maximum line voltage, $V_{max}$. This excessive heating will tend to shorten the igniter life. Apart from the ratio, if the room temperature resistivity is too high, the igniter may not reach the ignition temperature of the gas it is intended to ignite within the desired time frame.

In addition, in the fabrication process, igniters are often slotted to create legs of reduced cross-sectional area. The slotting process is often carried out dynamically by measuring the room temperature resistance as a slot is progressively lengthened until the desired room temperature resistance is achieved. The room temperature resistance is used to shorten the testing time following adjustments to slot length. However, if the room temperature resistance does not correlate well with the high temperature resistance, a given igniter may be slotted incorrectly and unable to achieve the desired temperature performance.

One type of hot surface igniter material that is well known is silicon carbide. The silicon carbide is typically formed into a slurry, shaped into a desired igniter preform shape, and then sintered. The sintering process can be adjusted to achieve desired electrical properties by doping with electron acceptors or donors. In certain known processes, the igniter body is subjected to a reducing atmosphere that comprises nitrogen during the sintering process to adjust the resistivity of the silicon carbide and provide oxidation resistance. During such processes, the silicon carbide vaporizes and recrystallizes with nitrogen incorporated as an n-type dopant into the silicon carbide lattice.

In certain known silicon carbide igniter manufacturing techniques, green (unsintered) igniter bodies are sintered in an inert (nitrogen-deficient) reducing atmosphere in a first relatively higher temperature sintering phase and then sintered in a 100 percent nitrogen sintering atmosphere in a second relatively lower sintering temperature phase. In other known techniques, structural ceramic bodies are sintered in a 100 percent nitrogen sintering atmosphere in a first sintering phase and are then sintered in a partially-nitrogenated, reducing atmosphere in a second sintering phrase. During the second sintering phase, the sintering temperature is ramped to a maximum sintering temperature, at which point the nitrogen content of the reducing atmosphere is reduced until it is entirely inert in a third sintering phase. A fourth sintering phase is then carried out in an inert reducing atmosphere at the maximum sintering temperature. Such known sintering techniques are generally incapable of providing igniters with the desired electrical properties for certain applications. Without wishing to be bound by any theory, it is believed that known processes have insufficiently coordinated the addition of nitrogen with the sintering temperature so that the recrystallization process is coordinated with the supply of nitrogen to provide the required degree of nitrogen incorporation for certain igniter applications.

Thus, a need has arisen for method of making a hot surface igniter which addresses the foregoing.

BRIEF DESCRIPTION OF THE DRAWINGS

FIG. 2 is a top plan view of a first example of a nitrogen-doped, silicon carbide, hot surface igniter;

DETAILED DESCRIPTION

Figure 1:
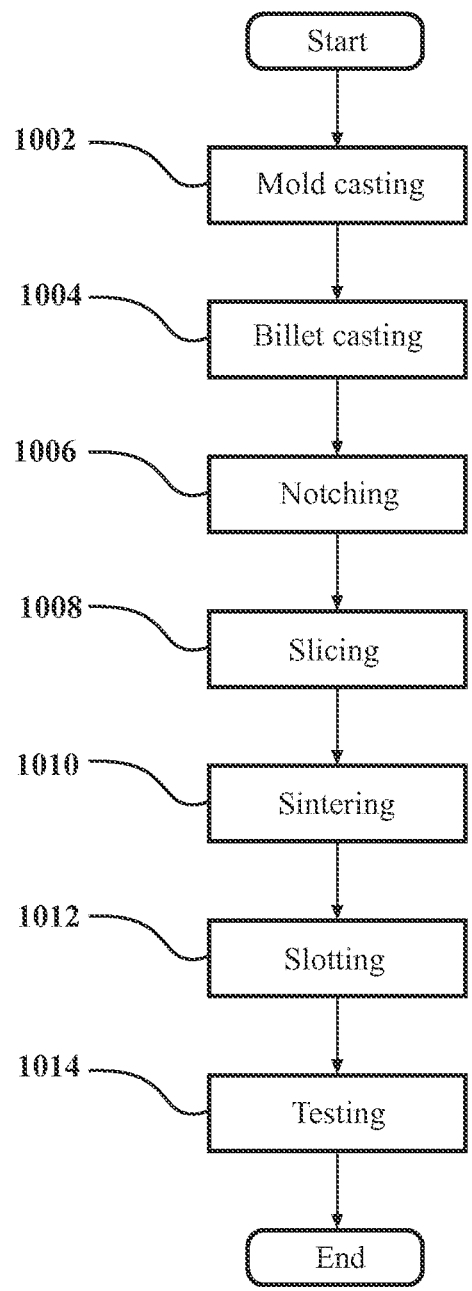
FIG. 1 is a flow chart depicting a method of making a hot surface igniter body.

Described below are examples of silicon carbide hot surface igniters and methods of making silicon carbide, hot surface igniters. In accordance with a first aspect, the igniter bodies comprise silicon carbide and have a green (unsintered) density that is greater than 70 percent of a theoretical maximum density and a sintered density that differs from the unsintered density by no more than about five (5) percent, preferably no more than about two (2) percent, and still preferably no more than about one (1) percent. The unsintered igniter bodies are subjected to a sintering process, at least a portion of which is conducted in a partially-nitrogenated, reducing atmosphere. In general, the methods described herein include sintering steps with a relatively lower temperature silicon carbide recrystallization phase and a relatively higher temperature silicon carbide recrystallization phase, and the introduction of the partially-nitrogenated, reducing atmosphere is coordinated with execution of these phases.

As used herein, the term "unsintered" refers to igniter bodies that have not been subjected to sintering as well as to igniter bodies that have only been partially sintered. The term "reducing atmosphere" refers to an atmosphere that is substantially, and preferably completely, devoid of molecular oxygen ($O_2$). As used in reference to silicon carbide, the phrase "fines portion" refers to a portion of a silicon carbide composition in which a distribution of particle sizes is present, and the D50 (median) particle size is from about 0.5 microns to about 10 microns, preferably from about 1 micron to about 8 microns, and still more preferably from about 2 microns to about 5 microns. The fines portion has a surface area that is preferably from greater than 1 $m^2/g$ to about 10 $m^2/g$, more preferably from about 2 $m^2/g$ to about 7 $m^2/g$, and still more preferably from about 4 $m^2/g$ to about 6 $m^2/g$.

As used in reference to silicon carbide, the phrase "coarse portion" refers to a portion of a silicon carbide composition in which a distribution of particle sizes is present, and the D50 (median) particle size is from about 50 microns to about 300 microns, preferably from about 80 microns to about 250 microns, and more preferably from about 90 microns to about 200 microns. The coarse portion has a surface area that is preferably less than 1 $m^2/g$.

As used herein, the phrase "room temperature resistivity" refers to a resistivity at 25° C. Unless otherwise specified, as used herein, the phrase "high temperature resistivity" refers to a resistivity at approximately 1000° C. Although other reference temperatures may be used.

In the discussion that follows, sintering processes are described as comprising various sintering periods, e.g., a "first sintering period," a "second sintering period," etc. The terms "first sintering temperature," "second sintering temperature," etc. are used to indicate that the sintering temperature is one that occurs during the corresponding period. For example, the phrase "first sintering temperature" refers to a temperature that occurs during the "first sintering period." However, during a given sintering period, the sintering temperature associated with that sintering period may take on one or more values. Thus, the phrases "first sintering temperature," "second sintering temperature," etc. do not refer uniquely to a single temperature value, but rather, to one or more temperature values that may be used during the corresponding sintering period. In general, during a given sintering period, the sintering furnace temperature will have an initial temperature (e.g., $T_{1i}$ for an initial temperature during a first sintering period) and a final temperature (e.g., $T_{1f}$ for a final temperature during a first sintering period). The sintering periods may have a maximum temperature (e.g., $T_{2max}$ for the maximum temperature during the second sintering period) which is greater than or equal to the initial sintering temperature for the period (e.g., $T_{2i}$ for the second sintering period initial temperature). During a sintering period, the sintering temperature may be adjusted from the initial value to the final value by using one or more ramps and one or more soaks. A "ramp" refers to a period during which the sintering temperature is progressively increased, either linearly or non-linearly. A "soak" refers to period during which a sintering temperature is held at a substantially constant or constant value. With respect to the measurement of sintering temperatures described herein, at temperatures above about 1600° C., an optical pyrometer is the preferred way of measuring temperature because certain thermocouples may break down at such temperatures. In addition, optical pyrometer readings may have some degree of variability, e.g., 10° C. to 15° C., based on type, emissivity setting, calibration, and siting target (location in the sintering furnace).

In accordance with a second aspect, a method of making a hot surface igniter is provided which comprises providing an unsintered hot surface igniter body comprising silicon carbide, wherein the silicon carbide comprises a fines portion and a coarse portion, and the coarse portion comprises at least about 20 percent by weight of the silicon carbide in the unsintered hot surface igniter body.

The method in accordance with the second aspect further comprises sintering the unsintered hot surface igniter body in a partially-nitrogenated reducing atmosphere at one or more sintering temperatures ranging from about 2075° C. to about 2425° C., preferably from about 2085° C. to about 2415° C., and more preferably from about 2100° C. to about 2400° C. for a sintering period of from about 20 minutes to about 2.5 hours, preferably from about 25 minutes to about 2.25 hours, and more preferably from about 30 minutes to about 2 hours. In general, as the sintering furnace loading (i.e., the number of igniter bodies) increases, it is preferable to increase the sintering time.

In accordance with the second aspect, the overall sintering period may be subdivided into several sintering periods. Each sintering period has a maximum sintering temperature that equals or exceeds a maximum sintering temperature from the preceding period and exceeds a minimum sintering temperature from the preceding period. In certain examples, the method in accordance with the second aspect further comprises sintering the unsintered hot surface igniter body in a partially-nitrogenated reducing atmosphere during a first sintering period at a first sintering temperature that is at least about 1000° C., preferably at least about 1050° C., and more preferably at least about 1100° C. for a first sintering period that is from about 120 minutes to about 180 minutes, preferably from about 140 minutes to about 170 minutes, and more preferably from about 150 minutes to about 160 minutes. The first sintering temperature during the first sintering period is preferably no more than about 2520° C., more preferably no more than about 2510° C., and still more preferably not more than about 2500° C.

In certain examples, the first sintering period includes a subperiod during which the first sintering temperature is at least about 2075° C., preferably at least about 2085° C., and still more preferably at least about 2100° C. The subperiod is at least about 40 minutes, preferably at least about 45 minutes, more preferably at least about 50 minutes.

During the first sintering period, the partially-nitrogenated reducing atmosphere comprises nitrogen gas in an amount ranging from about 20 mole percent to about 80 mole percent of the reducing atmosphere. In one example, the reducing atmosphere during the first sintering period comprises nitrogen and a noble gas. In another example, the reducing atmosphere during the first sintering period consists essentially of nitrogen and a noble gas. Helium and argon are preferred, and argon is the most preferred noble gas. In a further example, the reducing atmosphere during the first sintering period comprises from about 25 mole percent to about 60 mole percent nitrogen, and more preferably, the balance is a noble gas, which is most preferably argon. In an additional example, the reducing atmosphere during the first sintering period comprises from about 30 mole percent to about 40 mole percent nitrogen, and more preferably, the balance is a noble gas, preferably argon.

The method in accordance with the second aspect further comprises sintering the unsintered hot surface igniter body in a partially-nitrogenated atmosphere (which may have the same composition as the partially-nitrogenated atmosphere in the first sintering period) during a second sintering period at a second sintering temperature of at least about 200° C., preferably at least about 250° C., and more preferably at least about 300° C. In certain examples, the second sintering temperature has a maximum value of no more than about 2550° C., preferably no more than about 2520° C., and still more preferably no more than about 2500° C. The second sintering period is preferably at least about 120 minutes, more preferably at least about 140 minutes, and still more preferably at least about 150 minutes. In certain implementations, the second sintering period includes a first subperiod during which the second sintering temperature is at least about 2500° C. for a first subperiod of at least about 40 minutes, preferably at least about 50 minutes, and more preferably, at least about 60 minutes.

In accordance with methods of the first aspect and the second aspect, in certain examples, the silicon carbide used to form the hot surface igniter body includes a coarse portion and a fines portion, wherein the coarse portion comprises at least about 20 percent by weight of the silicon carbide, preferably at least about 30 percent by weight of the silicon carbide, and even more preferably at least about 40 percent by weight of the silicon carbide. At the same time, the coarse portion comprises no more than about 80 percent, more preferably no more than about 70 percent, and still more preferably no more than about 60 percent by weight of the silicon carbide in the unsintered hot surface igniter body.

Hot surface igniter bodies prepared in accordance with methods of the first and second aspects preferably comprise silicon carbide, at least one transition metal r, aluminum, and nitrogen. In preferred examples, hot surface igniter bodies prepared in accordance with methods of the first and second aspects consist essentially of silicon carbide, aluminum, at least one transition metal, and nitrogen. Trace amounts of impurities such as oxygen, vanadium, and chromium may also be present. The unsintered igniter bodies preferably include no added densification aids, such as boron carbide, boron nitride, aluminum carbide, carbon, beryllium oxide, hafnium oxide, and yttrium oxide. The at least one transition metal is preferably selected from the group consisting of tantalum (Ta), tungsten (W), molybdenum (Mo), zirconium (Zr), titanium (Ti), iron (Fe), and nickel (Ni). The at least one transition metal is preferably added to a slurry used to form the hot surface igniter body as a transition metal silicide or a transition metal silicide former selected from the group consisting of transition metal oxides, carbides, salts, and the transition metal itself. Suitable salts include nitrates.

In certain examples, the sintered hot surface igniter body has a silicon carbide content of at least about 90 percent, more preferably at least about 95 percent, and still more preferably at least about 99 percent by weight of the sintered hot surface igniter body.

In the same or other examples, the sintered igniter body has an aluminum content of at least about 200 ppm, preferably at least about 300 ppm, more preferably at least about 400 ppm, and still more preferably at least about 450 ppm. In the same or other examples, the sintered igniter body has an aluminum content that is no greater than about 1000 ppm, preferably no greater than about 800 ppm, more preferably no greater than about 600 ppm, and still more preferably no greater than about 550 ppm by weight of the sintered hot surface igniter body. The aluminum may be present as aluminum compounds or as aluminum atoms incorporated in the silicon carbide, but is believed to be the latter.

In the same or other examples, the sintered hot surface igniter body has a transition metal content on an atomic basis of the at least one transition metal of not more than about 1000 ppm, preferably not more than about 750 ppm, and still preferably not more than about 500 ppm. The at least one transition metal is generally believed to be present as an at least one transition metal silicide compound at the silicon carbide grain boundaries. However, the foregoing levels are based on the transition metal atom, not on a compound that may be formed therefrom.

In the same or other examples, the sintered hot surface igniter body has a nitrogen content of at least about 500 ppm, preferably at least about 550 ppm, and still more preferably at least about 600 ppm by weight of the sintered hot surface igniter body. In the same or other examples, the sintered hot surface igniter body has a nitrogen content of no more than about 1500 ppm, preferably no more than about 1300 ppm, and still more preferably no more than about 1000 ppm by weight of the sintered hot surface igniter body.

Hot surface igniter bodies prepared in accordance with the first aspect and the second aspect preferably have a negative temperature coefficient (NTC) (i.e., a ratio of room temperature resistance to high temperature resistance that is greater than 1.0). They may also preferably have a porosity that is greater than about seven (7) percent, more preferably greater than about ten (10) percent, and still more preferably greater than about fifteen (15) percent. In certain implementations, hot surface igniter bodies prepared in accordance with the first and second aspect have a green (unsintered) density that is greater than about 70 percent of a theoretical maximum density, preferably greater than about 75 percent of a theoretical maximum density, and more preferably greater than about 80 percent of a theoretical maximum density. At the same time, the green density is preferably no greater than about 90 percent of the theoretical maximum density, more preferably no greater than about 87 percent of the theoretical maximum density, and still more preferably no greater than about 85 percent of the theoretical maximum density. At the same time hot surface igniters prepared in accordance with methods of the second aspect may have a sintered density that differs from the unsintered density by no more than about five (5) percent, preferably no more than about two (2) percent, and still preferably no more than about one (1) percent.

Hot surface igniter bodies prepared in accordance with the first aspect and the second aspect preferably have a room temperature resistivity that is from about 0.2 ohm-cm to about 2.0 ohm-cm, more preferably from about 0.25 ohm-cm to about 1.0 ohm-cm, and still more preferably from about 0.3 ohm-cm to about 0.4 ohm-cm. Hot surface igniter bodies prepared in accordance with the first aspect and the second aspect preferably have a high temperature resistivity (i.e., resistivity at 1000° C.) of from about 0.12 ohm-cm to about 0.25 ohm-cm, more preferably from about 0.14 ohm-cm to about 0.20 ohm-cm, and still more preferably from about 0.18 ohm-cm to about 0.19 ohm-cm. Hot surface igniter bodies prepared in accordance with the first and second aspects preferably have a ratio of room temperature resistivity to high temperature resistivity of from about 1.5 to about 2.5, preferably from about 1.7 to about 2.3, and more preferably from about 1.9 to about 2.1.

Equation (1) above relates resistivity to resistance, length, and area for the case where the cross-sectional area perpendicular to current flow is constant and does not vary with the position along the igniter's length. In those cases where area is a function of the position along the length axis (L), the igniter body can be modeled as a series of short parts of constant cross-sectional area, each having its own resistance, wherein the resistances are additive to define the overall resistance of the igniter body. Thus, equation (1) can be rewritten as follows:

$$\rho = \frac{R}{\int_0^{L1} \frac{dL}{A(L)}} \quad (2)$$

where, $\rho$=resistivity (ohm-cm)
R=Total Resistance (ohms) along the length L1;
L=length (cm)

L1=length of igniter body from a first position along the length axis to second position along the length axis;
A(L)=cross-sectional area (cm$^2$) as a function of position along length axis L.

Thus, in accordance with equation (2), resistivity may be determined herein by measuring a resistance across an igniter body between two points that define two positions along the length (L) axis and then solving equation (2) using a known relationship between area (A) and length (L). Note that at certain igniter length axis positions, the igniter body defines a path for current flow that is in both the positive and negative directions along the igniter body length axis L. However, the length (L) used in equation (2) is the total length traveled along the length axis. Thus, if the igniter has a total length of 3 cm and two legs of the same length, L2 in equation (2) will be 6 cm (See FIGS. 10 and 13).

In accordance with a third aspect of the present disclosure, a hot surface igniter body is provided which comprises a silicon carbide composition having a high temperature resistivity (i.e., at 1000° C.) of from about 0.8 ohm-cm to about 3.5 ohm-cm, preferably from about 1 ohm-cm to about 3 ohm-cm, and more preferably from about 2 ohm-cm to about 2.5 ohm-cm. At the same time, the silicon carbide composition has a room temperature resistivity of at least about 3 ohm-cm, preferably at least about 3.5 ohm-cm, and more preferably at least about 4 ohm-cm. The silicon carbide composition has a room temperature resistivity of no more than about 60 ohm-cm, preferably no more than about 40 ohm-cm, and still more preferably no more than about 20 ohm-cm. The silicon carbide composition has a ratio of room temperature resistivity to high temperature (1000° C.) resistivity that is from about 5 to about 20, preferably from about 8 to about 15, and more preferably from about 10 to about 12. In preferred examples, the silicon carbide composition is essentially or completely free of transition metals and forms the distal part of an igniter body, wherein the proximal part of the igniter body comprises silicon carbide and at least one transition metal.

In certain examples in accordance with the third aspect, the sintered hot surface igniter body has a length along a length axis, and a composition that varies along the length axis. In one implementation, the sintered hot surface igniter body has a first proximal region that has a first composition and an adjacent distal region that has a second composition. In certain variations of this implementation, the proximal region of the sintered hot surface igniter body comprises first and second ends that are spaced apart from one another along a width axis, and the silicon carbide concentration in the distal region is greater than the silicon carbide concentration in the proximal region. In certain cases, the proximal region comprises a material that is has a relatively lower resistivity than silicon carbide, and the distal region is substantially devoid of the material. Suitable low resistivity materials include transition metals. Preferred transition metals include tantalum (Ta), tungsten (W), molybdenum (Mo), zirconium (Zr), titanium (Ti), iron (Fe), and nickel (Ni). In certain examples, molybdenum is especially preferred. Without wishing to be bound by any theory, the transition metal is believed to be present as a silicide of the transition metal.

In the same or other examples of the third aspect, the relatively resistive distal region of the sintered hot surface igniter has a silicon carbide content of at least about 90 percent, preferably at least about 95 percent, and more preferably at least about 99 percent by weight of the distal region of the sintered hot surface igniter body. In the same or other examples, the relatively resistive distal region of the sintered hot surface igniter body has an aluminum content of at least about 1000 ppm, preferably at least about 1500 ppm, more preferably at least about 1800 ppm, and still more preferably at least about 1900 ppm by weight of the distal region of the sintered hot surface igniter body. The aluminum may be present as an aluminum compound or as aluminum atoms in the silicon carbide lattice, but is believed to be the latter. The foregoing aluminum levels are based on atomic aluminum. The relatively resistive distal region of sintered hot surface igniter bodies prepared in accordance with the third aspect are preferably free of or substantially free of transition metals. Trace amounts of transition metals may be present as impurities, but iron compounds are not intentionally added during the fabrication process.

In certain exemplary methods of the third aspect, an unsintered, silicon carbide igniter body is sintered in a partially-nitrogenated reducing atmosphere at one or more sintering temperatures that are at least about 2400° C., preferably at least about 2425° C., and more preferably at least about 2450° C. for a sintering period of at least about 10 minutes, preferably at least about 12 minutes, and more preferably, at least about 15 minutes. At the same time, the sintering period is preferably no more than about 90 minutes, more preferably no more than about 80 minutes, and still more preferably no more than about 70 minutes. In accordance with such exemplary methods, nitrogen is preferably not introduced until a sintering temperature of at least about 2400° C., preferably at least about 2425° C., and more preferably at least about 2450° C. is reached.

In the same or other exemplary methods, the unsintered, silicon carbide igniter body is further sintered in reducing atmosphere that is entirely or substantially devoid of nitrogen for a sintering period of at least about 15 minutes, preferably at least about 20 minutes, and more preferably, at least about 25 minutes, and which is no greater than about 60 minutes, preferably no greater than about 40 minutes, and still more preferably no greater than about 35 minutes.

The sintering process in accordance with the third aspect may comprise multiple sintering periods. In certain examples, the unsintered igniter body is sintered during a first sintering period in a first reducing atmosphere that is substantially devoid of nitrogen, followed by a second sintering period in a second partially-nitrogenated reducing atmosphere. In certain examples, the first reducing atmosphere comprises a noble gas, preferably helium and/or argon, and most preferably argon. In the same or other examples, the second reducing atmosphere comprises nitrogen and a noble gas, preferably helium and/or argon, and more preferably argon. In accordance with methods of the third aspect, the unsintered igniter body is also sintered during a third sintering period in the second, partially-nitrogenated reducing atmosphere. Each sintering period includes a maximum sintering temperature that exceeds the minimum sintering temperature of the preceding periods. In certain examples in accordance with the third aspect, the second reducing atmosphere comprises nitrogen in amount that is at least about 10 mole percent, more preferably at least about 15 mole percent, and still more preferably at least about 20 mole percent of the reducing atmosphere, and even more preferably no more than about 25 mole percent of the reducing atmosphere. In accordance with such examples, nitrogen is preferably present in an amount no greater than about 80 mole percent, more preferably no more than about 70 mole percent, still more preferably no more than about 60 mole percent, and even more preferably no more than about 50 mole percent of the reducing atmosphere. In the same or other examples, the reducing atmosphere further comprises an inert gas other than nitrogen, such as a noble gas. Helium and argon are preferred noble gases, and argon is especially preferred.

In accordance with a fourth aspect, a method of making a sintered hot surface igniter is provided which comprises providing an unsintered igniter body comprising a proximal region adjacent a distal region along a length axis, wherein the proximal and distal regions comprise silicon carbide. The method further comprises sintering the unsintered hot surface igniter body to yield a sintered hot surface igniter body by using a sintering method that comprises sintering the unsintered hot surface igniter body in a first reducing atmosphere at a first sintering temperature for a first sintering period wherein the first reducing atmosphere is substantially devoid of nitrogen, and the first sintering period is at least about 15 minutes, preferably at least about 20 minutes, and more preferably at least about 25 minutes. The first sintering period is at preferably no greater than about 60 minutes, more preferably no greater than about 40 minutes, and still more preferably no greater than about 35 minutes.

The method in accordance with the fourth aspect also comprises sintering the unsintered hot surface igniter body in a second reducing atmosphere at a second sintering temperature for a second sintering period, wherein the second reducing atmosphere is partially nitrogenated, and the second sintering temperature is at least about 2400° C., preferably at least about 2425° C., and more preferably at least about 2450° C. during the second sintering period. In preferred implementations of the fourth aspect, nitrogen is not introduced in the reducing atmosphere until the sintering temperature is at least about 2440° C., preferably at least about 2445° C., and more preferably at least about 2450° C.

In certain examples of the third and fourth aspects, the distal region of the sintered hot surface igniter body has a nitrogen content of at least about 100 ppm, preferably at least about 200 ppm, and still more preferably at least about 300 ppm by weight of the sintered hot surface igniter body. In the same or other examples the distal region of the sintered hot surface igniter body has a nitrogen content of no more than about 600 ppm, preferably no more than about 550 ppm, and still more preferably no more than about 500 ppm by weight of the distal region of the hot surface igniter body.

In additional examples of the third and fourth aspects, the distal region of the hot surface igniter body comprises silicon carbide and is substantially, or preferably completely, devoid of transition metals, while the proximal region comprises both silicon carbide and at least one transition metal. In preferred examples, the transition metals in the proximal region of the hot surface igniter body are present (on an atomic basis of the transition metal) in an amount ranging from about 1.3 percent to about thirteen (13) percent by weight of the proximal region of the hot surface igniter body. In more preferred examples, the amount of the at least one transition metal in the proximal region is at from about 1.9 percent to about 9.5 percent, and more preferably from about 3.2 percent to about 6.3 percent by weight of the proximal region of the hot surface igniter body. Without wishing to be bound by any theory, it is believed that the at least one transition metal is present as at least one transition metal silicide, and in preferred examples, the amount of the at least one transition metal silicides (based on the transition metal silicide compound) in the proximal region is from about 3 percent to about 15 percent, and more preferably from about five (5) percent to about ten (10) percent by weight of the proximal region of the hot surface igniter body.

In the same or other examples, the amount of silicon carbide in the proximal region is at least about 87 percent, preferably at least about 93 percent, and even more preferably at least about 98 percent by weight of the proximal region. In the same or other examples, the amount of aluminum (on an aluminum atomic basis) in the proximal region is at least about 1000 ppm, preferably at least about 1500 ppm, more preferably at least about 1800 ppm, and still more preferably at least about 1900 ppm by weight of the proximal region of the hot surface igniter body.

When the distal and proximal regions of the hot surface igniter body are exposed to the same nitrogenated atmosphere for the same amount of time and at the same temperatures, they will typically have similar or substantially identical concentrations of nitrogen. However, without wishing to be bound by any theory, it is believed that when both nitrogen and at least one transition metal silicide or transition metal silicide former are used to form the proximal region, the amount of nitrogen in the proximal region is not critical to the electrical performance if the igniter. In certain examples, the amount of nitrogen in the proximal region of the hot surface igniter body is at least about 100 ppm, preferably at least about 350 ppm, and still more preferably at least about 400 ppm of the proximal region of the hot surface igniter body, and the amount of nitrogen in the proximal region is no more than about 1000 ppm, preferably no more than about 650 ppm, and still preferably no more than about 600 ppm by weight of the proximal region of the hot surfaced igniter body.

Igniter bodies prepared in accordance with the third and fourth aspects may have more than two zones, any or all of which may include concentration gradients of one or more constituents along a portion of the zone.

Referring to FIG. 2, a hot surface igniter 20 is depicted which comprises a sintered hot surface igniter body 22 and a terminal block 24. The sintered hot surface igniter body 22 is a ceramic structure that heats up as a voltage is provided across the proximal leg ends 56 and 58, which are in electrical communication with conductors 26a and 26b. The conductors 26a and 26b are connected to opposite terminals of a voltage source (not shown). Portions of the proximal leg ends 56 and 58 which extend into the terminal block 24 are arc sprayed with a nickel alloy to facilitate electrical connection to conductors 26a and 26b.

The terminal block 24 is an insulating material, such as alumina, cordierite, and steatite, inside of which the conductors 26a and 26b are electrically connected to the proximal leg ends 56a and 56b of the hot surface igniter body. Slots 40, 42, and 43 are cut along the length axis L of the hot surface igniter body 22 to define legs 32, 34, 36 and 38. The legs 32, 34, 36, and 38 are elongated areas of reduced cross-sectional area which provide concentrated sections of resistance heating by providing areas of increased resistance in accordance with equation (1), above.

Referring to FIG. 1, an overall process for manufacturing a silicon carbide, hot surface igniter is depicted. Additional steps may be included. The steps in the figure are intended to provide a general description of the overall process. In accordance with the method, in step 1002 a mold is created with a mold cavity having a shape corresponding to a plurality of hot surface igniter bodies. Suitable mold materials include plaster of Paris. The mold is used to form a billet, which is an unsintered block of ceramic material from which individual igniter bodies are cut. In step 1004, the billet is cast. In this step, the materials used to form the silicon carbide igniter are formed into a moldable, aqueous slurry and poured into the mold cavity. In accordance with one example, silicon carbide powder is combined with aluminum oxide, at least one transition metal silicide or transition metal silicide former, a latex binder, and water to form an aqueous slurry. The at least one transition metal in the at least one transition metal silicide or transition metal silicide former is preferably selected from the group consisting of tantalum (Ta), tungsten (W), molybdenum (Mo), zirconium (Zr), titanium (Ti), iron (Fe), and nickel (Ni). Suitable transition metal silicide formers are preferably selected from the group consisting of transition metal oxides, carbides, salts, and the transition metal itself. Suitable salts include nitrates.

The amounts of silicon carbide, aluminum oxide, and the at least one transition metal silicide or transition metal silicide former are selected to achieve desired levels (described above) of silicon carbide, aluminum (as atomic aluminum or a compound comprising aluminum), and at least one transition metal (as the atomic transition metal or a compound formed therefrom) in the sintered hot surface igniter body. The water is removed during an air curing step (1004), and the latex binder is burned off during sintering (step 1010). The aluminum in the aluminum oxide is believed to be incorporated as atomic aluminum in the silicon carbide lattice, and the at least one transition metal is believed to be present as a transition metal silicide compound at the grain boundaries of the silicon carbide.

A notching process is performed in step 1006. In this step, a section of material is removed along the length of the billet (which corresponds to the thickness dimension of the igniter body) to create two spaced apart sections that will ultimately define the proximal end of the igniter bodies. In FIG. 2, the proximal end comprises proximal leg ends 56 and 58, which are spaced apart along the width axis of the igniter. This spacing is initially created by notching the billet. In FIG. 2, the notched area is the rectangular region identified as 47.

In step 1008, the billet is sliced along its width axis at intervals along its length to create individual, unsintered igniter bodies. The billet length axis intervals define the thickness dimension of each igniter body. The unsintered igniter bodies are then loaded into a sintering furnace and subjected to varying sintering temperatures during varying sintering periods in a reducing atmosphere. Specific sintering methods will be described in greater detail below.

Following the sintering process, the sintered igniter bodies are slotted along their lengths to create slots such as slots 40, 42, and 43 in FIG. 2. The slotting process defines the length and cross-sectional area of the heating path through the igniter body. For a sintered igniter body formed from a given material, the resistivity will be fixed. However, in accordance with equation (1), the length and cross-sectional area of regions of the igniter body will determine the level of resistive heating that the igniter will generate when subjected to a given voltage at a given temperature. Thus, the slotting process can be used to adjust the heating ability of individual igniters or batches of igniters to meet desired specifications for a heating application of interest. In one example, a room temperature resistance specification is set for each igniter, and one or more slots are cut to a specific length along the length axis of the igniter. The room temperature resistance is then measured and compared to the specification. If the measured resistance is too low, the slot is lengthened to increase the region of resistance heating on the igniter body. In another example, side slots 40 and 43 are cut to a fixed length, and the length of center slot 42 is adjusted to achieve a desired overall igniter body resistance. The slotted igniters are arc sprayed with nickel in a region of proximal ends 56 and 58 that is not visible in FIG. 2. The proximal ends 56 and 58 are then connected to respective terminal blocks 24 (FIG. 2) and electrically connected to conductors 26a and 26b therein.

Figure 3A:
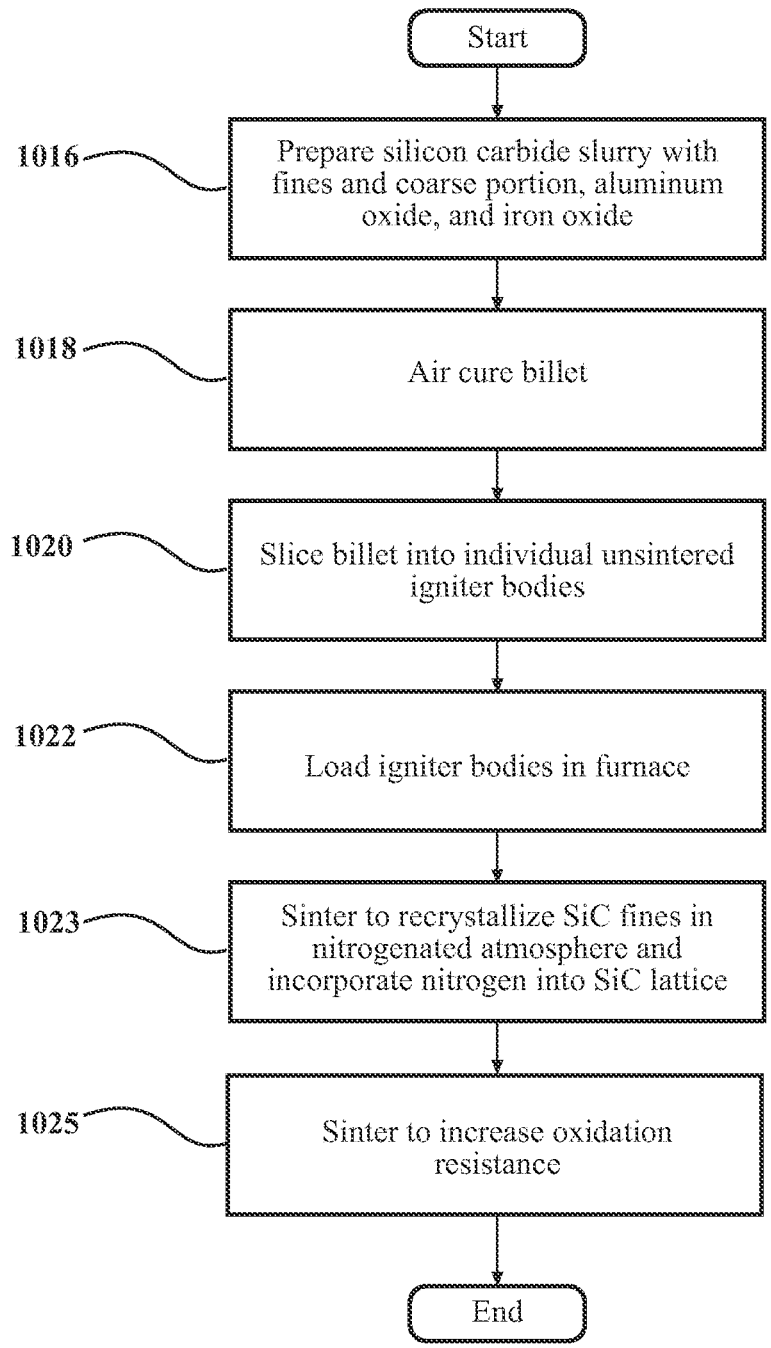
FIG. 3A is a flow chart depicting a first method of making a silicon carbide, hot surface igniter body by sintering an unsintered hot surface igniter body in a partially nitrogenated, reducing atmosphere to incorporate nitrogen into the silicon carbide lattice and increase the igniter body's oxidation resistance.

Referring to FIG. 3A, a flow chart depicting a method of making a silicon carbide, hot surface igniter is depicted. The method of FIG. 3A utilizes a sintering process in which an unsintered, silicon carbide hot surface igniter is sintered in a partially-nitrogenated, reducing atmosphere. In preferred examples, the method of FIG. 3A is carried out in a manner that controls the amount of nitrogen incorporated into the silicon carbide lattice.

Referring to the method, in step 1016 an aqueous slurry is prepared which comprises silicon carbide, a latex binder, and water. In preferred examples, the slurry also includes aluminum oxide and/or at least one transition metal silicide or at least one transition metal silicide former. The transition metal in the at least one transition metal silicide or transition metal silicide former is preferably selected from the group consisting of tantalum (Ta), tungsten (W), molybdenum (Mo), zirconium (Zr), titanium (Ti), iron (Fe), and nickel (Ni). Suitable transition metal formers are preferably selected from the group consisting of oxides, carbides, salts, and the transition metal itself. Suitable salts include nitrates. The amount of silicon carbide added to the slurry is preferably selected to achieve a content of silicon carbide in the sintered hot surface igniter body which exceeds 90 percent, more preferably exceeds 95 percent, and still more preferably exceeds 99 percent by weight of the sintered, hot surface igniter body.

When aluminum oxide is present, it is preferably added in an amount sufficient to provide an aluminum content (on an aluminum atomic basis) in the sintered hot surface igniter body which is at least about 200 ppm, preferably at least about 300 ppm, more preferably at least about 400 ppm, and still more preferably at least about 450 ppm. In the same or other examples, the sintered igniter body has an aluminum content (on an aluminum atomic basis) that is no greater than about 1000 ppm, preferably no greater than about 800 ppm, more preferably no greater than about 600 ppm, and still more preferably no greater than about 550 ppm by weight of the sintered hot surface igniter body. The aluminum in the sintered hot surface igniter may be present as aluminum atoms incorporated into the silicon carbide lattice or as an aluminum compound. However, aluminum atoms are typically incorporated into the silicon carbide lattice.

When at least one transition metal silicide or transition metal silicide former is present in the slurry of step 1016, it is preferably added in an amount sufficient to provide an amount of the at least one transition metal (on an atomic basis) in the sintered hot surface igniter body of not more than about 1000 ppm, preferably not more than about 750 ppm, and still preferably not more than about 500 ppm. The at least one transition metal is generally believed to be present as a silicide compound at the silicon carbide grain boundaries. However, the foregoing levels are on an atomic basis of the at least one transition metal.

The silicon carbide added to the aqueous slurry preferably comprises a coarse portion and a fines portion. The coarse portion preferably comprises at least about 20 percent, more preferably at least about 30 percent, and still more preferably at least about 40 percent by weight of the silicon carbide in the aqueous slurry. The coarse portion preferably comprises no more than 80 percent, more preferably no more than about 70 percent, and still more preferably no more than about 60 percent by weight of the silicon carbide in the aqueous slurry. The slurry is molded and air cured to create a billet in step 1018. After notching, the billet is sliced into individual, green (unsintered) igniter bodies in step 1020, which are then loaded into a sintering furnace (step 1022). The green igniter bodies preferably have a density that is at least about 70 percent, preferably at least about 75 percent, and more preferably at least about 80 percent of the theoretical maximum density. At the same time, the green igniter bodies preferably have a density that is no greater than about 90 percent of the theoretical maximum density, more preferably no greater than about 87 percent of the theoretical maximum density, and still more preferably no greater than about 85 percent of the theoretical maximum density.

The sintering process of the method of FIG. 3A comprises two sintering steps 1023 and 1025. Each is carried out in a reducing atmosphere that is partially, but preferably not wholly, nitrogenated (i.e., the atmosphere in the sintering furnace is less than 100 mole percent nitrogen).

The first sintering step (1023) is a relatively lower temperature sintering step, and the second sintering step (1025) is a relatively higher temperature sintering step. The word "relatively" refers to the fact that the maximum temperature in step 1025 is greater than or equal to the maximum temperature in step 1023, and the maximum temperature in step 1025 is greater than the minimum temperature in step 1023. Without wishing to be bound by any theory, it is believed that during the relatively lower temperature sintering step 1023, the fines portion of the silicon carbide vaporizes and recrystallizes such that some amount of the nitrogen in the partially-nitrogenated reducing atmosphere is incorporated into the recrystallized silicon carbide lattice, thereby providing an n-doped silicon carbide lattice with enhanced electrical properties.

The second sintering step (1025) is relatively higher temperature sintering step. Without wishing to be bound by any theory, it is believed that during this step, recrystallization of silicon carbide continues, but with relatively less incorporation of nitrogen into the silicon carbide lattice. This step increases the oxidation resistance of the igniter body.

The method of FIG. 3A yields a sintered, hot surface silicon carbide igniter body that comprises nitrogen. The nitrogen content is preferably from at least about 500 ppm, preferably at least about 550 ppm, and still more preferably at least about 600 ppm by weight of the sintered hot surface igniter body. In the same or other examples, the sintered hot surface igniter body has a nitrogen content of no more than about 1500 ppm, preferably no more than about 1300 ppm, and still more preferably no more than about 1000 ppm by weight of the sintered hot surface igniter body.

In preferred examples, the sintered igniter body has a negative temperature coefficient. In the same or other examples, the sintered igniter body has a density that differs from the igniter body's green density by no more than about five (5) percent, preferably no more than about two (2) percent, and still preferably no more than about one (1) percent. In the same or other examples, the sintered igniter body consists essentially of silicon carbide, at least one transition metal (which may be present as at least one transition metal silicide compound), aluminum, and nitrogen, although trace levels of oxygen, chromium, and vanadium may be present as impurities. In the same or other examples, the sintered igniter body has a porosity that is greater than about seven (7) percent, more preferably greater than about ten (10) percent, and still more preferably greater than about fifteen (15) percent. Igniters prepared in accordance with the method of FIG. 3A preferably have a room temperature resistivity that is from about 0.2 ohm-cm to about 2.0 ohm-cm, more preferably from about 0.25 ohm-cm to about 1.0 ohm-cm, and still more preferably from about 0.3 ohm-cm to about 0.4 ohm-cm. Hot surface igniter bodies prepared in accordance with the method of FIG. 3A preferably have a high temperature resistivity (i.e., resistivity at 1000° C.) of from about 0.12 ohm-cm to about 0.25 ohm-cm, more preferably from about 0.14 ohm-cm to about 0.20 ohm-cm, and still more preferably from about 0.18 ohm-cm to about 0.19 ohm-cm. Hot surface igniter bodies prepared in accordance with the method of FIG. 3A preferably have a ratio of room temperature resistivity to high temperature resistivity of from about 1.5 to about 2.5, preferably from about 1.7 to about 2.3, and more preferably from about 1.9 to about 2.1.

In certain preferred examples, the method of FIG. 3A is carried out without using any added densification aids. As used herein, the term "densification" aid refers to a material that aids in increasing the density of silicon carbide during sintering. The excluded densification aids include boron carbide, boron nitride, aluminum carbide, carbon, beryllium oxide, hafnium oxide, and yttrium oxide.

Figure 3B:
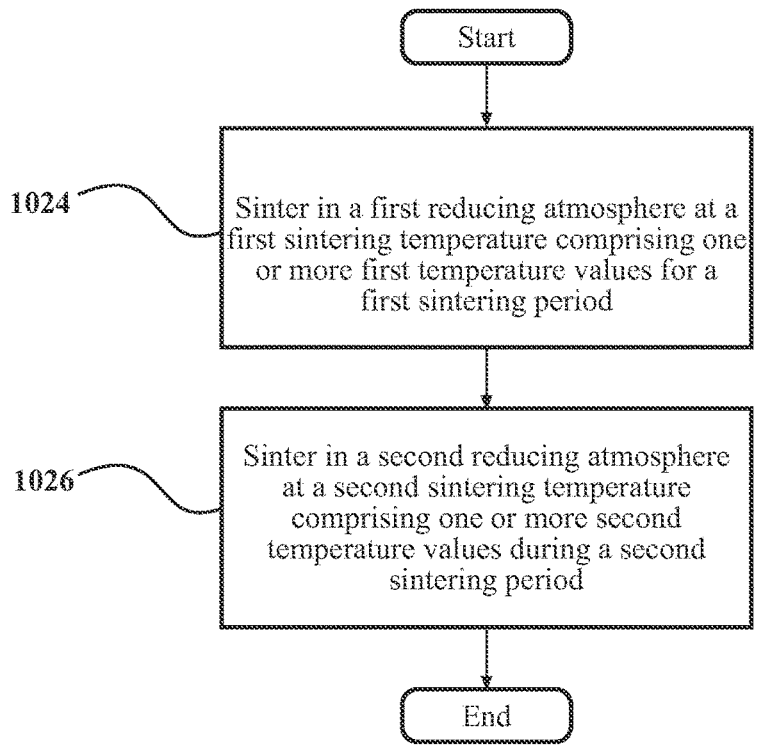
FIG. 3B is a flow chart depicting a particular implementation of the sintering steps of FIG. 3A.

FIG. 3B depicts a particular implementation of the sintering steps 1023 and 1025 of FIG. 3A. In preferred examples, the first sintering step 1024 is carried out at a variable first sintering temperature comprising one or more first temperature values during a first sintering period. The beginning of the first sintering period of step 1024 occurs when the partially-nitrogenated reducing atmosphere is introduced to the sintering furnace.

In preferred examples, step 1024 is carried out in a partially-nitrogenated reducing atmosphere at one or more sintering temperatures ranging from about 2075° C. to about 2425° C., preferably from about 2085° C. to about 2415° C., and more preferably from about 2100° C. to about 2400° C. for a sintering period of from about 20 minutes to about 2.5 hours, preferably from about 25 minutes to about 2.25 hours, and more preferably from about 30 minutes to about 2 hours. In general, as the sintering furnace loading (i.e., the number of igniter bodies) increases, it is preferable to increase the sintering time, flow rate, and/or level of nitrogen in the gas mixture.

In the same or other examples, step 1024 is carried out during a first sintering period at al first sintering temperature that is at least about 850° C., preferably at least about 950° C., and more preferably at least about 1050° C. for a first sintering period that is from about 100 minutes to about 200 minutes, preferably from about 120 minutes to about 180 minutes, and more preferably from about 140 minutes to about 160 minutes. The first sintering temperature during the first sintering period is preferably no more than about 2520° C., more preferably no more than about 2510° C., and still more preferably not more than about 2500° C. Without wishing to be bound by any theory or limit the scope of the claims in any way, it is believed that operating in the foregoing temperature range for the foregoing period of time beneficially promotes recrystallization of silicon carbide fines and the incorporation of nitrogen from the partially-nitrogenated reducing atmosphere into the recrystallized silicon carbide lattice.

In certain examples, the first sintering period in step 1024 includes a subperiod during which the first sintering temperature is at least about 2100° C. The subperiod is at least about 40 minutes, preferably at least about 45 minutes, more preferably at least about 50 minutes. At the same time, the first subperiod is no more than about 70 minutes, preferably no more than about 65 minutes, more preferably no more than about 60 minutes.

In certain implementations of step 1024, during the first sintering period there is preferably a second subperiod (in lieu of or in addition to the first subperiod) during which the first sintering temperature is at least about 2300° C. for a second subperiod of at least about 10 minutes, preferably at least about 15 minutes, and more preferably at least about 20 minutes. During the second subperiod, the first sintering temperature is preferably no more than about 2520° C., more preferably no more than about 2510° C. and still more preferably no more than about 2500° C.

In certain implementations, the first sintering period includes a third subperiod in lieu of either or both or in addition to the first and subperiods during which the first sintering temperature is at least about 2350° C. for a second subperiod of at least about 7 minutes, preferably at least about 10 minutes, and more preferably at least about 15 minutes. During the third subperiod, the first sintering temperature is preferably no more than about 2520° C., more preferably no more than about 2510° C. and still more preferably no more than about 2500° C.

In additional implementations, the first sintering period includes a fourth subperiod in addition to or in lieu of any or all of the first, second, and third subperiods during which the first sintering temperature is at least about 2400° C. for a fourth subperiod of at least about 5 minutes, preferably at least about 7 minutes, and more preferably at least about 10 minutes. During the fourth subperiod, the first sintering temperature is preferably no more than about 2520° C., more preferably no more than about 2510° C. and still more preferably no more than about 2500° C.

Figure 7:
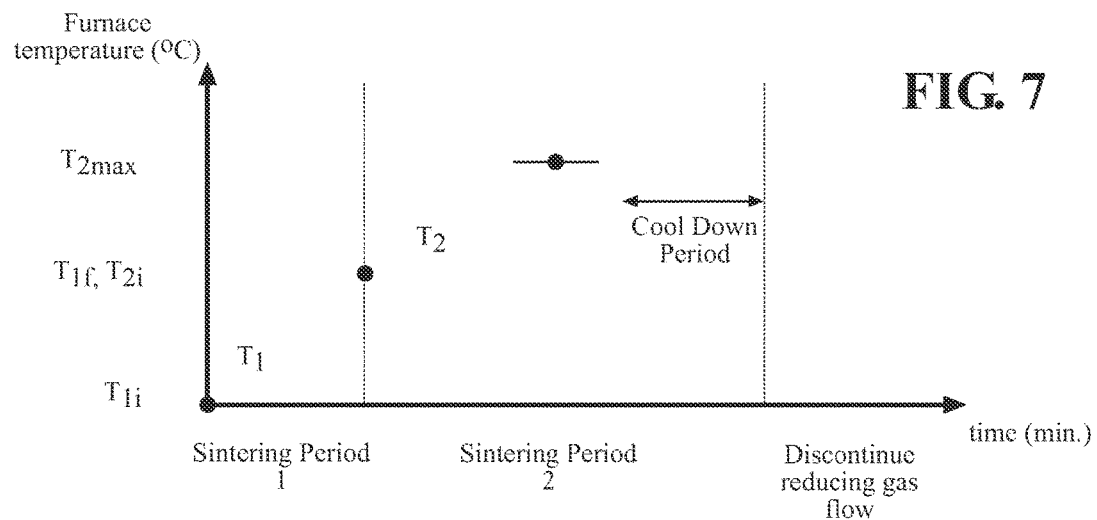
FIG. 7 is a graph depicting temperature and time profiles for first and second sintering periods during the sintering of an unsintered hot surface igniter body.

In FIG. 7, $T_1$ represents the variable sintering temperature during the first sintering period. As indicated in the figure, $T_{1i}$ represents the initial sintering temperature in the first sintering period, and $T_{1f}$ represents the final sintering temperature in the first sintering period, which coincides with the second sintering period initial temperature $T_{2i}$.

Figure 4:
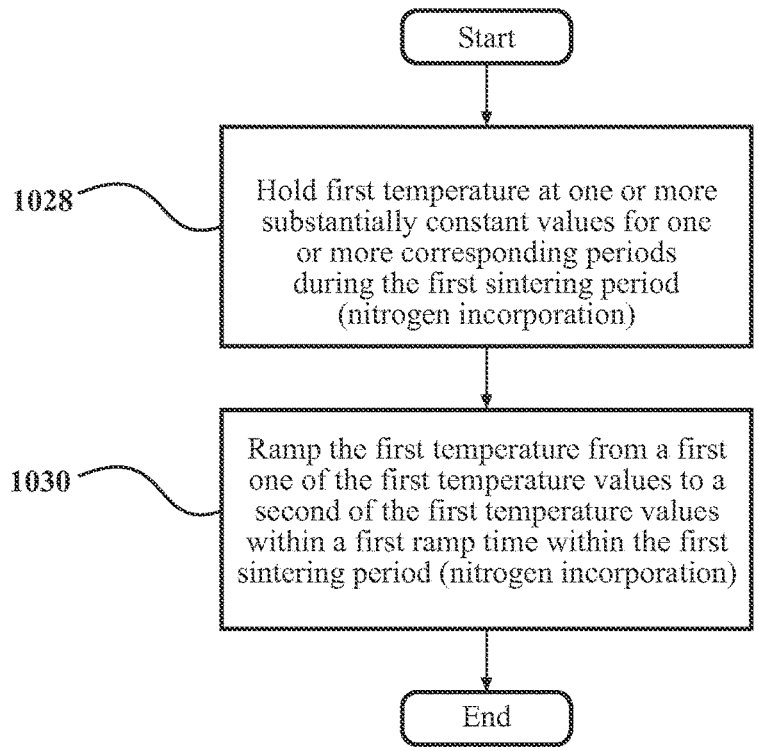
FIG. 4 is a flow chart depicting a method of using ramps and soaks to sinter an unsintered silicon carbide, hot surface igniter body during a first, relatively lower temperature, sintering period.

As shown in FIG. 4, the first sintering period may comprise one or more temperature soaks (step 1028) and one or more temperature ramps (step 1030), each occurring for a specified period of time within the first sintering period. In one example, one or more soaks are performed at a temperature ranging from about 2000° C. to about 2200° C. for a total soak period of at least about 2 minutes, preferably at least about 4 minutes, and still more preferably at least about 5 minutes. Within this range, soak temperatures ranging from about 2050° C. to about 2150° C. are more preferred, and soak temperatures ranging from about 2090° C. to about 2110° C. are even more preferred.

As shown in step 1030 of FIG. 4, in certain implementations, the first sintering period includes one or more temperature ramps which may occur between temperature soaks. When multiple temperature ramps are used, it is understood that there is no overlap in the temperature values during different temperature ramps (except that when one ramp transitions immediately into another, the final temperature of the earlier ramp may equal the initial temperature of the later ramp) and that when sequential ramps are used, their respective ramp temperature increase as time progresses during the first sintering period.

In one implementation, the one or more ramps include a first temperature ramp that is carried out during the first sintering period from a first ramp initial temperature that ranges from about 1000° C. to about 1200° C., preferably from about 1050° C. to about 1150° C., and more preferably from about 1090° C. to about 1110° C. until a final ramp temperature is reached. In accordance with the one implementation, the first ramp final temperature ranges from about 2000° C. to about 2200° C., preferably from about 2050° C. to about 2150° C., and more preferably from about 2090° C. to about 2110° C. The first ramp time ranges from about 60 minutes to about 140 minutes, preferably from about 80 minutes to about 120 minutes, and still more preferably from about 90 minutes to about 110 minutes.

In certain implementations, the one or more ramps include a second temperature ramp carried out in lieu of or in addition to the first ramp. The second temperature ramp is preferably carried out during the first sintering period from a second ramp initial temperature that ranges from about 2000° C. to about 2200° C., preferably from about 2050° C. to about 2150° C., and more preferably from about 2090° C. to about 2110° C. The second ramp final temperature is preferably at least about 2480° C., more preferably at least about 2490° C., and more preferably at least about 2495° C. The second ramp final temperature is no more than about 2520° C., preferably no more than about 2510° C. and still more preferably no more than about 2505° C. The second ramp time preferably ranges from about 30 minutes to about 70 minutes, more preferably from about 40 minutes to about 60 minutes, and still more preferably from about 45 minutes to about 55 minutes.

In the method of FIG. 3B, the first reducing atmosphere preferably comprises nitrogen in amount that is at least about 10 mole percent, more preferably at least about 15 mole percent, and still more preferably at least about 20 mole percent of the reducing atmosphere, and even more preferably at least about 25 mole percent of the reducing atmosphere. Nitrogen is preferably present in an amount no greater than about 80 mole percent, more preferably no more than about 70 mole percent, still more preferably no more than about 60 mole percent, and even more preferably no more than about 50 mole percent of the reducing atmosphere. In the same or other examples, the reducing atmosphere further comprises an inert gas other than nitrogen, such as noble gas. Helium and argon are preferred noble gases, and argon is especially preferred.

Step 1026 in FIG. 3B is carried out in a second reducing atmosphere at a second reducing temperature that may have one or more second temperature values for a second sintering period. The second reducing atmosphere may have a partially-nitrogenated composition of the type described above for the first reducing atmosphere. In certain implementations, the second reducing atmosphere has substantially the same or the same composition as the first reducing atmosphere.

Step 1026 comprises sintering the unsintered hot surface igniter body in a partially-nitrogenated atmosphere (which may have the same composition as the partially-nitrogenated atmosphere in the first sintering period) during a second sintering period at second sintering temperature of at least about 200° C., preferably at least about 250° C., and more preferably at least about 300° C. The second sintering temperature has a maximum value of not more than about 2550° C., preferably not more than about 2520° C., and still more preferably not more than about 2500° C. The second sintering period is preferably at least about 100 minutes, more preferably at least about 120 minutes, and still more preferably at least about 140 minutes. The second sintering period is preferably no more than about 220 minutes, preferably no more than about 200 minutes, and still more preferably no more than about 180 minutes.

In certain implementations, the second sintering period includes a first subperiod during which the second sintering temperature is at least about 2500° C. for a first subperiod of at least about 40 minutes, preferably at least about 50 minutes, and more preferably, at least about 60 minutes.

The final value of the second sintering temperature is defined by the cessation of the gas flow that provides a reducing atmosphere (e.g., nitrogen and argon). In certain examples, the final value of the second sintering temperature ranges from about 200° C. to about 500° C., preferably from about 250° C. to about 400° C., and more preferably from about 300° C. to about 350° C.

Figure 5:
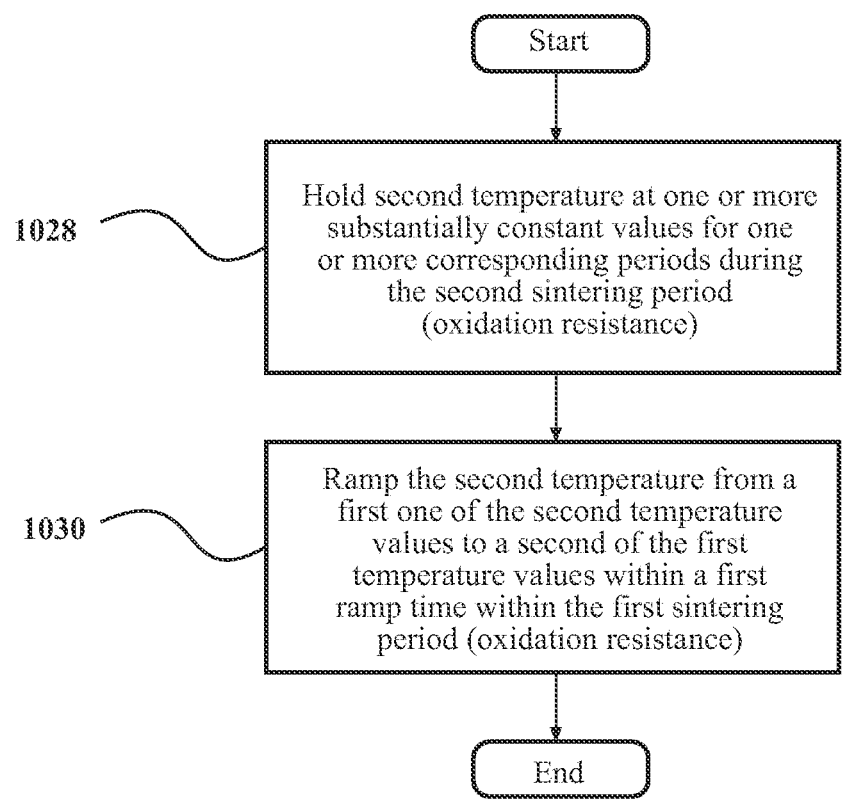
FIG. 5 is a flow chart depicting a method of using ramps and soaks to sinter an unsintered silicon carbide, hot surface igniter body during a second, relatively higher temperature, sintering period.

As shown in FIG. 5, the second sintering period may comprise one or more temperature soaks (step 1028) and one or more temperature ramps (step 1030). In certain examples, the second sintering period includes a first temperature soak at a first soak temperature ranging from about 2480° C. to about 2520° C., preferably from about 2490° C. to about 2510° C., and still more preferably from about 2495° C. to about 2505° C. The first temperature soak period in the second sintering period is preferably from about 30 minutes to about 90 minutes, more preferably from about 40 minutes to about 80 minutes, and still more preferably from about 55 minutes to about 65 minutes.

The second sintering period may also comprise one or more temperature ramps (step 1030). In one example, the second sintering period includes a cool down period initiated with a temperature ramp. The ramp initial temperature preferably ranges from about 2480° C. to about 2520° C., more preferably from about 2490° C. to about 2510° C., and still more preferably from about 2495° C. to about 2505° C. The second ramp final temperature preferably ranges from about 1600° C. to about 2000° C., more preferably from about 1700° C. to about 1900° C., and still more preferably from about 1750° C. to about 1850° C. The second ramp time is preferably from about 50 minutes to about 90 minutes, more preferably from about 60 minutes to about 80 minutes, and still more preferably from about 65 minutes to about 75 minutes.

The methods of FIGS. 3B, 4 and 5 yield a sintered, hot surface silicon carbide igniter body that comprises nitrogen. The nitrogen content is preferably from at least about 500 ppm, preferably at least about 550 ppm, and still more preferably at least about 600 ppm by weight of the sintered hot surface igniter body. In the same or other examples, the sintered hot surface igniter body has a nitrogen content of no more than about 1500 ppm, preferably no more than about 1300 ppm, and still more preferably no more than about 1000 ppm by weight of the sintered hot surface igniter body.

In preferred examples, the sintered igniter body has a negative temperature coefficient. In the same or other examples, the sintered igniter body has a density that differs from the igniter body's green density by no more than about five (5) percent, preferably no more than about two (2) percent, and still preferably no more than about one (1) percent. In the same or other examples, the sintered igniter body consists essentially of silicon carbide, at least one transition metal (which may be present as a transition metal silicide), aluminum, and nitrogen, although trace levels of oxygen, chromium, and vanadium may be present as impurities. In the same or other examples, the sintered igniter body has a porosity that is greater than about seven (7) percent, more preferably greater than about ten (10) percent, and still more preferably greater than about fifteen (15) percent. Igniters prepared in accordance with the method of FIG. 3 preferably have a room temperature resistivity that is from about 0.2 ohm-cm to about 2.0 ohm-cm, more preferably from about 0.25 ohm-cm to about 1.0 ohm-cm, and still more preferably from about 0.3 ohm-cm to about 0.4 ohm-cm. Hot surface igniter bodies prepared in accordance with the methods of FIG. 3B, 4, or 5 preferably have a high temperature resistivity (i.e., resistivity at 1000° C.) of from about 0.12 ohm-cm to about 0.25 ohm-cm, more preferably from about 0.14 ohm-cm to about 0.20 ohm-cm, and still more preferably from about 0.18 ohm-cm to about 0.19 ohm-cm. Hot surface igniter bodies prepared in accordance with the method of FIG. 3B, 4, or 5 preferably have a ratio of room temperature resistivity to high temperature resistivity of from about 1.5 to about 2.5, preferably from about 1.7 to about 2.3, and more preferably from about 1.9 to about 2.1.

Figure 6:
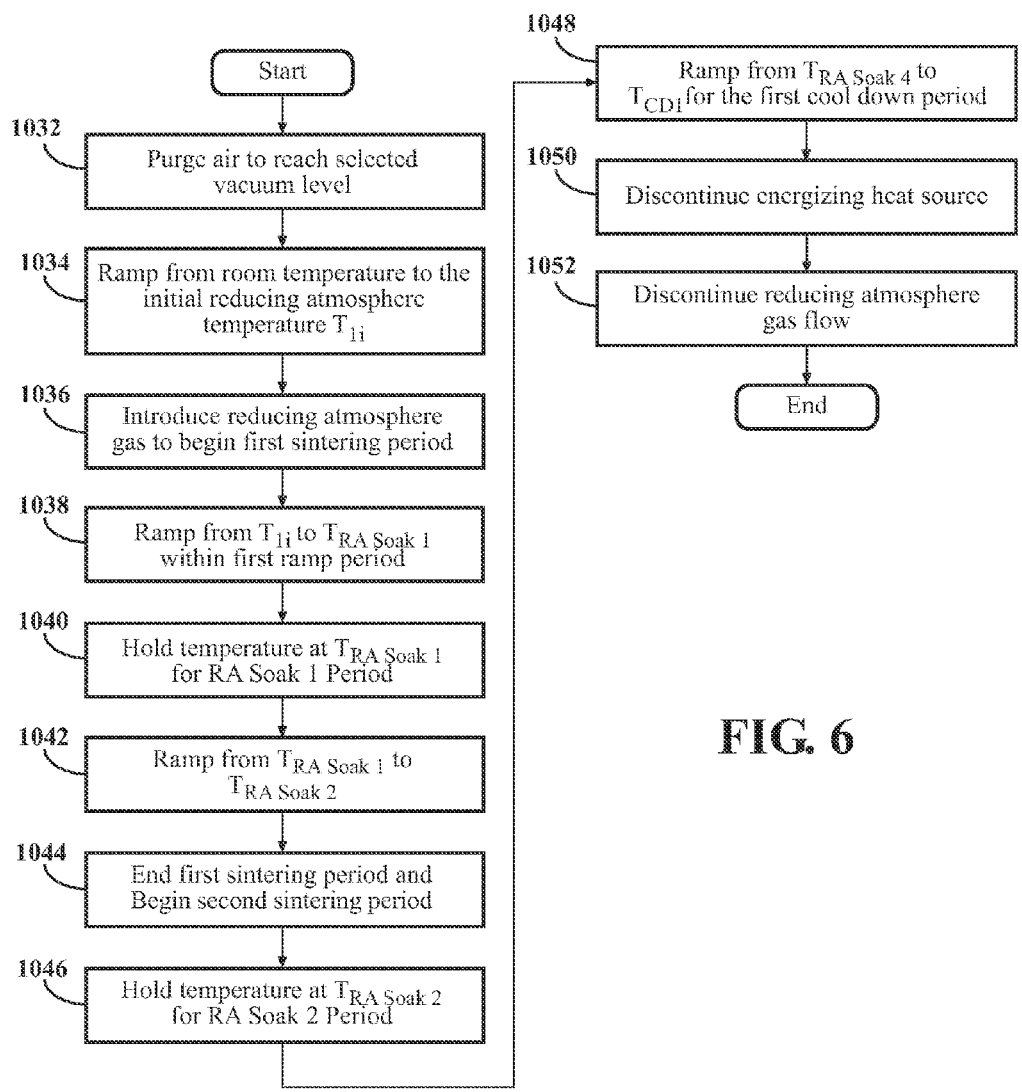
FIG. 6 is a flow chart depicting a second method of making a silicon carbide, hot surface igniter body by sintering an unsintered hot surface igniter body in a partially nitrogenated, reducing atmosphere.

Referring to FIG. 6, another exemplary method of making a silicon carbide, hot surface igniter is depicted. The method of FIG. 6 comprises a method of sintering an unsintered hot surface igniter body in a partially-nitrogenated, reducing atmosphere. In accordance with the method, a plurality of green (unsintered) hot surface silicon carbide igniter bodies are loaded into a sintering furnace. In certain preferred examples, the method of FIG. 6 is carried out without using any densification aids. The excluded densification aids include boron carbide, boron nitride, aluminum carbide, carbon, beryllium oxide, hafnium oxide, and yttrium oxide. The unsintered igniter bodies that are sintered using the method of FIG. 6 preferably have a green density that is greater than about 70 percent of a theoretical maximum density, preferably greater than about 75 percent of a theoretical maximum density, and more preferably greater than about 80 percent of a theoretical maximum density. At the same time, the green density is preferably no greater than about 90 percent of the theoretical maximum density, more preferably no greater than about 87 percent of the theoretical maximum density, and still more preferably no greater than about 85 percent of the theoretical maximum density.

The unsintered igniter bodies preferably comprise silicon carbide, at least one transition metal silicide or transition metal silicide former, aluminum oxide, and some residual amount of latex binder following an air curing process. The amounts of silicon carbide, aluminum oxide, and the at least one transition metal silicide or transition metal silicide former are preferably selected to provide the amounts of silicon carbide, at least one transition metal and aluminum in the sintered igniter which are described previously. In certain examples, the unsintered igniter bodies preferably consist essentially of silicon carbide, at least one transition metal silicide or transition metal silicide former, aluminum oxide, and some amount of latex binder, with the amounts of silicon carbide, aluminum oxide, and the at least one transition metal silicide or transition metal silicide former being those specified previously. The at least one transition metal in the at least one transition metal silicide or transition metal silicide former is preferably selected from the group consisting of tantalum (Ta), tungsten (W), molybdenum (Mo), zirconium (Zr), titanium (Ti), iron (Fe), and nickel (Ni). Suitable transition metal silicide formers are preferably selected from the group consisting of transition metal oxides, carbides, salts, and the transition metal itself. Suitable salts include nitrates.

In step 1032, a vacuum system operatively connected to the interior of the furnace is activated to purge air and reduce the air pressure to a value of from about 5 microns of mercury (relative to vacuum) to about 50 microns, preferably from about 10 microns to about 20 microns, and more preferably from about 14 microns to about 16 microns.

In step 1034, the sintering furnace heating element is energized to begin ramping the temperature in the interior of the furnace from room temperature to an initial reducing atmosphere sintering temperature $T_{1i}$ (FIG. 7). The initial reducing atmosphere sintering temperature $T_{1i}$ is from about 1000° C. to about 1200° C., preferably from about 1050° C. to about 1150° C., and more preferably from about 1090° C. to about 1110° C. During this period, the gases used to provide a partially-nitrogenated reducing atmosphere have not yet been introduced into the sintering furnace, and the interior of the furnace is operating at the sub-atmospheric pressure established in step 1032. The ramp time during step 1034 ranges from about 50 minutes to about 90 minutes, preferably from about 60 minutes to about 80 minutes, and still more preferably from about 65 minutes to about 75 minutes.

A reducing atmosphere is provided in the interior of the sintering furnace in step 1036 to initiate the first sintering period. The reducing atmosphere is partially, but not wholly, nitrogenated. In accordance with the step, a flow of nitrogen and a non-nitrogen inert gas into the sintering furnace is initiated. In preferred examples, the flow of gas is adjusted to provide a pressure in the interior of the sintering furnace that is near atmospheric. The pressure preferably ranges from about 12 psia to about 18 psia, more preferably from about 13 psia to about 17 psia, and still more preferably from about 15 psia to about 16 psia (i.e., from about 0.3 psig to about 1.3 psig). The partially-nitrogenated reducing atmosphere preferably comprises nitrogen in amount that is at least about 10 mole percent, more preferably at least about 15 mole percent, and still more preferably at least about 20 mole percent of the reducing atmosphere, and even more preferably at least about 25 mole percent of the reducing atmosphere. Nitrogen is preferably present in an amount no greater than about 80 mole percent, more preferably no more than about 70 mole percent, still more preferably no more than about 60 mole percent, and even more preferably no more than about 50 mole percent of the reducing atmosphere. In the same or other examples, the reducing atmosphere further comprises an inert gas other than nitrogen, such as helium or argon. Argon is especially preferred.

In step 1038, the first sintering temperature is ramped from its initial value of $T_{1i}$ to a first reducing atmosphere soak temperature $T_{RA\ Soak\ 1}$ during a first reducing atmosphere ramp period. The first reducing atmosphere soak temperature $T_{RA\ Soak\ 1}$ ranges from about 2000° C. to about 2200° C. Within this range, first reducing atmosphere soak temperatures ranging from about 2050° C. to about 2150° C. are more preferred, and first reducing atmosphere soak temperatures ranging from about 2090° C. to about 2110° C. are even more preferred.

In step 1040 a soak is carried out at the first reducing atmosphere soak temperature $T_{RA\ Soak\ 1}$ for a total soak period of at least about 2 minutes, preferably at least about 4 minutes, and still more preferably at least about 5 minutes. The soak period for step 1040 is preferably no more than about 30 minutes, more preferably no more than about 20 minutes, and still more preferably no more than about 15 minutes.

In step 1042, the first sintering temperature is ramped in a second reducing atmosphere temperature ramp from the previous soak temperature $T_{RA\ Soak\ 1}$ to a next reducing atmosphere soak temperature $T_{RA\ Soak\ 2}$. The second reducing atmosphere soak temperature $T_{RA\ Soak\ 2}$ is preferably at least about 2480° C., more preferably at least about 2490° C., and more preferably at least about 2495° C. The second reducing atmosphere soak temperature is no more than about 2550° C., preferably no more than about 2520° C. and still more preferably no more than about 2500° C.

In step 1044, the first sintering period ends, and the second sintering period begins. Referring to FIG. 7, the second soak temperature $T_{RA\ Soak\ 2}$ is the final temperature of the first sintering period ($T_{1f}$) and the initial temperature of the second soak period ($T_{2i}$). Without wishing to be bound by any theory, it is believed that a sintering temperature having a value at or above the preferred ranges of $T_{RA\ Soak\ 2}$ transitions the process from one in which incorporation of nitrogen into the silicon lattice is dominant to one in which the incorporation is significantly reduced, and the igniter body develops enhanced oxidation resistance.

In step 1046 the second soak is preferably carried out for a second soak period of at least about 40 minutes, preferably at least about 50 minutes, and more preferably at least about 55 minutes. The second soak period is preferably no more than about 90 minutes, more preferably no more than about 80 minutes, and still more preferably no more than about 70 minutes. At higher furnace loadings (i.e., higher numbers of igniter bodies), increased soak times, gas flow rates and/or levels of nitrogen in the gas mixture are preferred.

In step 1048 the second sintering temperature is ramped downward from the reducing atmosphere second soak temperature ($T_{RA\ soak\ 2}$) to a cool down temperature ($T_{CD1}$). In preferred examples, $T_{CD1}$ ranges from about 1600° C. to about 2000° C., more preferably from about 1700° C. to about 1900° C., and still more preferably from about 1750° C. to about 1850° C. The ramp time in step 1048 is preferably from about 50 minutes to about 90 minutes, more preferably from about 60 minutes to about 80 minutes, and still more preferably from about 65 minutes to about 75 minutes.

As the foregoing indicates, in the example of steps 1046 and 1048, the maximum sintering temperature during the second sintering period ($T_{2max}$ in FIG. 7) is the same as the initial second sintering period temperature ($T_{2i}$ in FIG. 7). However, this will not necessarily be the case, and in other examples, the maximum sintering temperature ($T_{2max}$) during the second sintering period will exceed the initial temperature ($T_{2i}$) during the second sintering period.

The sintering furnace heating source is de-energized in step 1050, and the temperature is allowed to fall in an unregulated manner until it reaches a gas cessation value. When the temperature reaches a gas cessation temperature value, the flow of the partially-nitrogenated reducing atmosphere gases is discontinued (step 1062). In certain examples, the gas cessation temperature value ranges from about 200° C. to about 500° C., preferably from about 250° C. to about 400° C., and more preferably from about 300° C. to about 350° C.

The method of FIG. 6 yields a sintered, hot surface silicon carbide igniter body that comprises nitrogen. The nitrogen content is preferably from about 500 ppm to about 1500 ppm by weight, preferably from about 550 ppm to about 1300 ppm by weight, and more preferably from about 600 ppm to about 1000 ppm by weight of nitrogen. The sintered igniter body preferably consists essentially of silicon carbide, aluminum, at least one transition metal (which may be present as a transition metal silicide), and nitrogen, although oxygen, vanadium, and chromium may be present as impurities in trace amounts. Hot surface igniter bodies prepared in accordance with the method of FIG. 6 preferably a negative temperature coefficient. In the same or other examples, such igniter bodies also have a porosity that is greater than about seven (7) percent, more preferably greater than about ten (10) percent, and still more preferably greater than about fifteen (15) percent. In addition, the density of the sintered igniters preferably differs from their green (unsintered) density by an amount that is no more than about five (5) percent, preferably no more than about two (2) percent, and more preferably no more than about one (1) percent.

Igniters prepared in accordance with the method of FIG. 6 preferably have a room temperature resistivity that is from about 0.2 ohm-cm to about 2.0 ohm-cm, more preferably from about 0.25 ohm-cm to about 1.0 ohm-cm, and still more preferably from about 0.3 ohm-cm to about 0.4 ohm-cm. Hot surface igniter bodies prepared in accordance with the method of FIG. 6 preferably have a high temperature resistivity (i.e., resistivity at 1000° C.) of from about 0.12 ohm-cm to about 0.25 ohm-cm, more preferably from about 0.14 ohm-cm to about 0.20 ohm-cm, and still more preferably from about 0.18 ohm-cm to about 0.19 ohm-cm. Hot surface igniter bodies prepared in accordance with the method of FIG. 6 preferably have a ratio of room temperature resistivity to high temperature resistivity of from about 1.5 to about 2.5, preferably from about 1.7 to about 2.3, and more preferably from about 1.9 to about 2.1.

Referring again to FIG. 2, a silicon carbide hot surface igniter 20 made in accordance with the methods of FIGS. 3, 4, 5, and/or 6 is depicted. The igniter body 22 is sintered and has a proximal end 53 and a distal end 30. The proximal end 53 is spaced apart from the distal end 30 along the length axis L. Igniter body 22 includes four legs 32, 34, 36, and 38, each of which has a length along the length axis L and a width along the width axis W. The legs 32, 34, 36, and 38 are provided by cutting slots into the igniter body 22 after it is sintered. Each leg 32, 34, 36, and 38 defines a region of reduced cross-sectional area (perpendicular to the length axis L) and increases the path length of current flow from first proximal end 56 to second proximal end 58, which are spaced apart from one another along the width axis W and which hare respectively in electrical communication with opposite terminals of a source of electrical potential. The pattern of legs 32, 34, 36, and 38 is sometimes referred to as a "serpentine" pattern in the art of hot surface igniter design.

First leg 32 has a proximal end 56 and a distal end 48. Leg 34 is adjacent leg 32 in the width direction and has a proximal end 46 and a distal end 48. Thus, first and second legs 32 and 34 have separate proximal ends 56 and 46 that are spaced apart from one another along the length and width axes, but share a common distal end 48. The common distal end 48 provides a path for current flow from first leg 32 to second leg 34.

Third leg 36 has a proximal end 46 and a distal end 50. Third leg 36 and second leg 34 share a common proximal end 46 but have distal ends 48 and 50 that are spaced apart from one another along the width axis. Thus, common proximal end 46 provides a location for current flow from the second leg 34 to the third leg 36.

Third leg 36 and fourth leg 38 share a common distal end 50 and have proximal ends 46 and 58 that are spaced apart from one another along both the length and width axes. The common distal end 50 provides a location for current flow from the third leg 36 to the fourth leg 38.

As shown in FIG. 2, the first leg proximal end 56 and fourth leg proximal end 58 are spaced apart along the width axis. The first leg proximal end 56 is operatively connected to conductor 26a within terminal block 24, and fourth leg proximal end 58 is operatively connected to conductor 26b within terminal block 24. In certain examples, portions of the proximal leg ends 56 and 58 (not visible in FIG. 2) are arc sprayed with nickel to facilitate electrical connection to conductors 26a and 26b. The first and fourth leg proximal ends 56 and 58 are in electrical communication with one another exclusively by way of the sintered igniter body 22. First leg proximal end 56 includes a shoulder 60, a concave transition 44, a straight transition 64 and a sloped transition 66 that is located distally from the concave transition 44 and straight transition 64 along the length axis L. Correspondingly, second leg proximal end 58 includes a shoulder 68, a concave transition 54, a straight transition 74, and a sloped transition 76, wherein the sloped transition is 76 is located distally from the straight transition 74 and concave transition 54 along the length axis. The silicon carbide hot surface igniter body 22 preferably has the silicon carbide, aluminum, at least one transition metal, and nitrogen content described previously.

As mentioned previously, in a third aspect of the present disclosure, a silicon carbide hot surface igniter body is prepared by sintering a green body comprising silicon carbide in one reducing atmosphere that is substantially or wholly devoid of nitrogen and in another reducing atmosphere that is partially nitrogenated. In certain examples, the step of sintering the unsintered hot surface igniter body in a reducing atmosphere that is substantially devoid of nitrogen is carried out before the step of sintering the unsintered hot surface igniter body in a partially-nitrogenated reducing atmosphere. In a preferred implementation, the first reducing atmosphere that is substantially devoid of nitrogen comprises a noble gas, and the second partially nitrogenated atmosphere comprises nitrogen and the noble gas. Preferred noble gases include helium and/or argon. Argon is most preferred.

Figure 8:
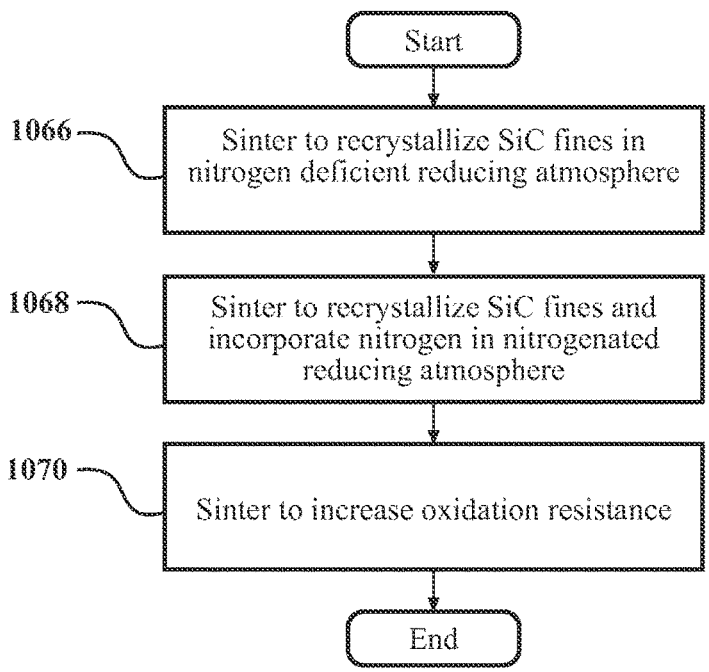
FIG. 8 is a flow chart depicting a third method of making a silicon carbide, hot surface igniter body by sintering an unsintered hot surface igniter in a first, nitrogen depleted reducing atmosphere and in a second, partially-nitrogenated reducing atmosphere.

Referring to FIG. 8, a method of sintering an unsintered hot surface igniter body is described. The unsintered hot surface igniter body comprises silicon carbide in an amount sufficient to provide a silicon carbide content in the sintered body that is at least about 90 percent, preferably at least about 95 percent, and more preferably at least about 99 percent by weight of the sintered hot surface igniter body. In certain preferred examples, the unsintered igniter body includes aluminum oxide, and in other preferred examples. When aluminum oxide is present, it is preferably present in an amount sufficient to provide an aluminum content (on an atomic aluminum basis) in the sintered hot surface igniter body which is at least about 200 ppm, preferably at least about 300 ppm, more preferably at least about 400 ppm, and still more preferably at least about 450 ppm. In the same or other examples, the amount of aluminum oxide is sufficient to yield a sintered igniter body having an aluminum content (on an atomic aluminum basis) that is no greater than about 1000 ppm, preferably no greater than about 800 ppm, more preferably no greater than about 600 ppm, and still more preferably no greater than about 550 ppm by weight of the sintered hot surface igniter body. The aluminum in the sintered hot surface igniter may be present as aluminum atoms incorporated into the silicon carbide lattice or as an aluminum compound. However, aluminum atoms are typically incorporated into the silicon carbide lattice. In certain preferred examples, the method of FIG. 8 is carried out without using any densification aids. The excluded densification aids include boron carbide, boron nitride, aluminum carbide, carbon, beryllium oxide, hafnium oxide, and yttrium oxide. In certain examples, the hot surface igniter bodies produced by the method of FIG. 8 are iron free or substantially iron free.

The silicon carbide in the unsintered hot surface igniter body preferably comprises a coarse portion and a fines portion. The coarse portion preferably comprises at least about 20 percent, more preferably at least about 30 percent, and still more preferably at least about 40 percent by weight of the silicon carbide in the unsintered body slurry. The coarse portion preferably comprises no more than 80 percent, more preferably no more than about 70 percent, and still more preferably no more than about 60 percent by weight of the silicon carbide in the unsintered hot surface igniter body.

In certain examples, the unsintered igniter body comprises a relatively resistive portion and a relatively conductive portion, and the foregoing amounts of silicon carbide and aluminum oxide are present in the relatively resistive portion. In preferred implementations, the relatively resistive portion is distal of the relatively conductive portion so that the relatively conductive portion is between the relatively resistive portion and the conductors connected to a source of electrical potential. The relatively conductive proximal portion in the unsintered relatively conductive proximal portion comprises a conductive material, such as at least one transition metal silicide or transition metal silicide former, which reduces the resistivity of the relatively conductive portion compared to the relatively resistive portion. The relatively resistive distal portion is substantially or completely devoid of transition metals. The transition metal in the at least one transition metal silicide or transition metal silicide former used to form the unsintered proximal region of the igniter body is preferably selected from the group consisting of tantalum (Ta), tungsten (W), molybdenum (Mo), zirconium (Zr), titanium (Ti), iron (Fe), and nickel (Ni). Suitable transition metal silicide formers are preferably selected from the group consisting of oxides, carbides, salts, and the metal itself. Suitable salts include nitrates. In certain examples, molybdenum disilicide is especially preferred. The method of FIG. 8 can be carried out on unsintered igniter bodies that include only a relatively resistive portion as well as those that include both a relatively resistive and a relatively conductive portion.

Referring again to FIG. 8, in step 1066 the unsintered hot surface igniter body is sintered to recrystallize the silicon carbide fines in a reducing atmosphere that is substantially or entirely devoid of nitrogen for a first sintering period. The reducing atmosphere may comprise an inert gas other than nitrogen. Suitable examples include noble gases such as argon and helium. In one example, the reducing atmosphere consists essentially of argon. Without wishing to be bound by any theory, it is believed that during step 1066 silicon carbide fines recrystallize, but since the reducing atmosphere is substantially or entirely devoid of nitrogen, there is no incorporation of nitrogen into the lattice of the recrystallized silicon carbide.

In step 1068, the igniter body is sintered to recrystallize silicon carbide fines in a nitrogenated reducing atmosphere that is preferably partially-nitrogenated, for a second sintering period. In one example, the partially-nitrogenated reducing atmosphere comprises nitrogen and a noble gas such as helium and/or argon. In another example, the partially-nitrogenated reducing atmosphere preferably comprises nitrogen in amount that is at least about 10 mole percent, more preferably at least about 15 mole percent, and still more preferably at least about 20 mole percent of the reducing atmosphere, and even more preferably no more than about 25 mole percent of the reducing atmosphere. In accordance with the example, nitrogen is preferably present in an amount no greater than about 80 mole percent, more preferably no more than about 70 mole percent, still more preferably no more than about 60 mole percent, and even more preferably no more than about 50 mole percent of the reducing atmosphere. In the same or other examples, the reducing atmosphere further comprises an inert gas other than nitrogen, such as helium or argon. Argon is especially preferred. Without wishing to be bound by any theory, it is believed that during step 1068, silicon carbide fines recrystallize and incorporate nitrogen into the silicon carbide lattice.

In step 1070, sintering is carried out with the partially-nitrogenated reducing atmosphere of step 1068 for a third sintering period in a manner that increases the oxidation resistance of the igniter. Without wishing to be bound by any theory, it is believed that in step 1070 recrystallization of silicon carbide fines continues but with relatively less incorporation of nitrogen fines into the silicon carbide lattice than during step 1068. The three sintering periods 1066, 1068, and 1070 are characterized by temperature profiles wherein the maximum temperature in a given sintering period is greater than or equal to the maximum temperature in the preceding periods and is greater than the minimum temperature in the preceding periods.

The method of FIG. 8 yields a relatively resistive sintered, silicon carbide composition that comprises nitrogen. The nitrogen content is at least about 100 ppm, preferably at least about 200 ppm, and still more preferably at least about 300 ppm by weight of the sintered hot surface igniter body. In the same or other examples the nitrogen content is no more than about 600 ppm, preferably no more than about 550 ppm, and still more preferably no more than about 500 ppm by weight of the hot surface igniter body. The igniter body preferably has a negative temperature coefficient.

In certain preferred examples, the relatively resistive sintered silicon carbide compositions prepared in accordance with the method of FIG. 8 have a high temperature resistivity (i.e., at 1000° C.) of from about 0.8 ohm-cm to about 3.5 ohm-cm, preferably from about 1 ohm-cm to about 3 ohm-cm, and more preferably from about 2 ohm-cm to about 2.5 ohm-cm. At the same time, the relatively resistive sintered silicon carbide composition has a room temperature resistivity of at least about 3 ohm-cm, preferably at least about 3.5 ohm-cm, and more preferably at least about 4 ohm-cm. The relatively resistive sintered silicon carbide composition has a room temperature resistivity of no more than about 60 ohm-cm, preferably no more than about 40 ohm-cm, and still more preferably no more than about 20 ohm-cm. The sintered silicon carbide composition has a ratio of room temperature resistivity to high temperature (1000° C.) resistivity that is from about 5 to about 20, preferably from about 8 to about 15, and more preferably from about 10 to about 12. In preferred examples, the relatively resistive silicon carbide composition is essentially or completely free of transition metals and forms the distal part of an igniter body, wherein the proximal part of the igniter body is relatively conductive and comprises silicon carbide and at least one transition metal silicide. Both the relatively resistive and relatively conductive compositions are subjected to the sintering method of FIG. 8.

The relatively resistive sintered silicon carbide compositions prepared in accordance with the method of FIG. 8 preferably consist essentially of silicon carbide, aluminum, and nitrogen, although transition metals, vanadium, chromium, and oxygen may be present as impurities in trace amounts. Igniter bodies formed from the relatively resistive sintered silicon carbide compositions of the method of FIG. 8 preferably have a density that is at least about 70 percent, preferably at least about 75 percent, and more preferably at least about 80 percent of the theoretical maximum density. The igniter bodies preferably have a density that is no greater than about 90 percent of the theoretical maximum density, more preferably no greater than about 87 percent of the theoretical maximum density, and still more preferably no greater than about 85 percent of the theoretical maximum density.

In addition, relatively resistive sintered silicon carbide compositions prepared in accordance with the method of FIG. 8 preferably have a sintered density that differs from the unsintered density by no more than about five (5) percent, preferably no more than about two (2) percent, and still preferably no more than about one (1) percent. In the same or other examples, igniter bodies formed from silicon carbide igniter compositions prepared in accordance with the method of FIG. 8 have a porosity that is greater than about seven (7) percent, more preferably greater than about ten (10) percent, and still more preferably greater than about fifteen (15) percent.

As mentioned previously, igniter bodies are slotted to define regions of reduced cross-sectional area that provide a desired level of resistive heating for an igniter body having a particular composition and associated resistivity. In many cases, to meet certain performance requirements, a serpentine igniter design such as the one depicted in FIG. 2 is required when using igniters prepared using known processes and compositions. Such designs include elongated regions of reduced cross-sectional area which are particularly vulnerable to damage.

Figure 10:
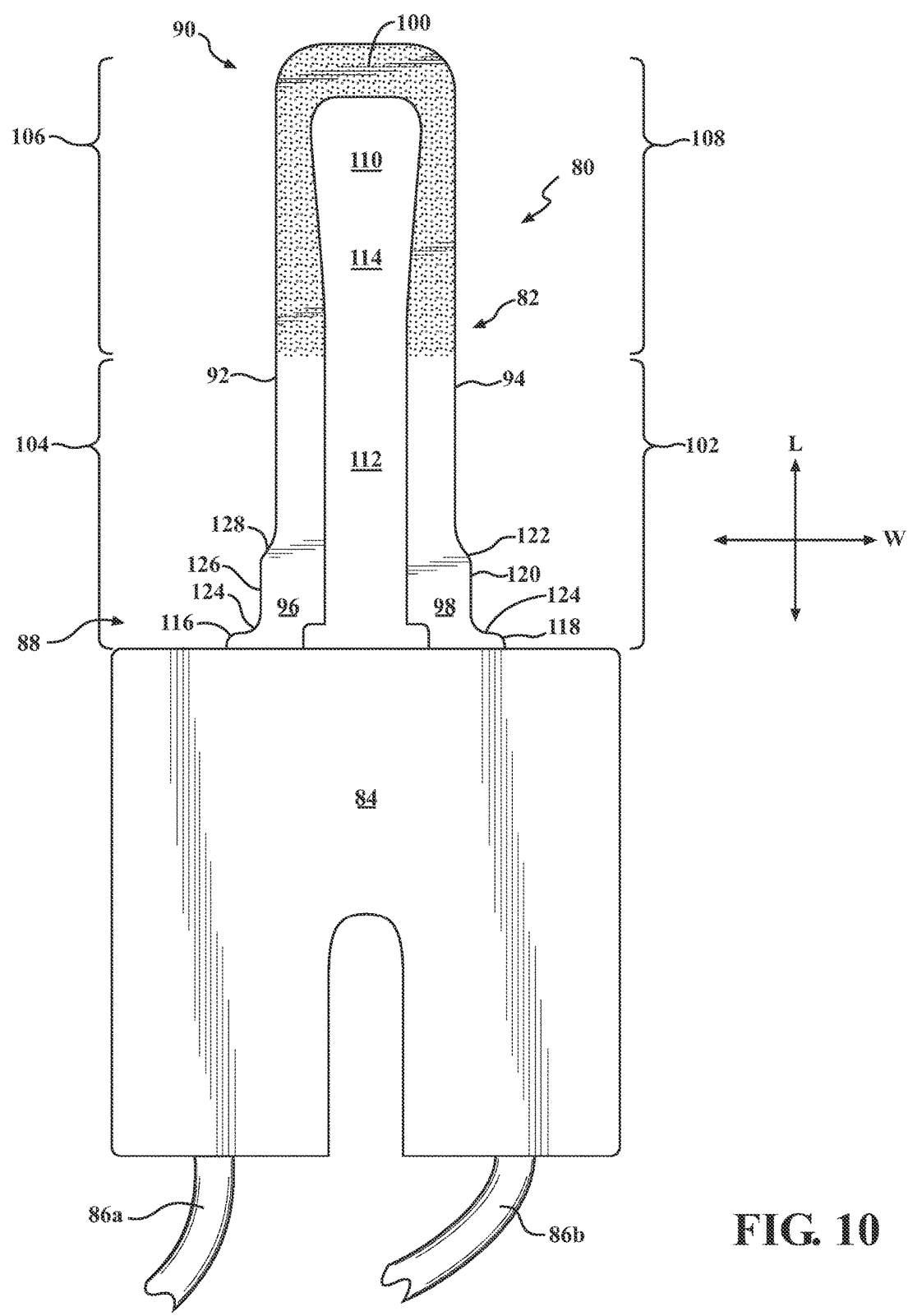
FIG. 10 is a top plan view of a second example of a nitrogen-doped, silicon carbide igniter.
Figure 13:
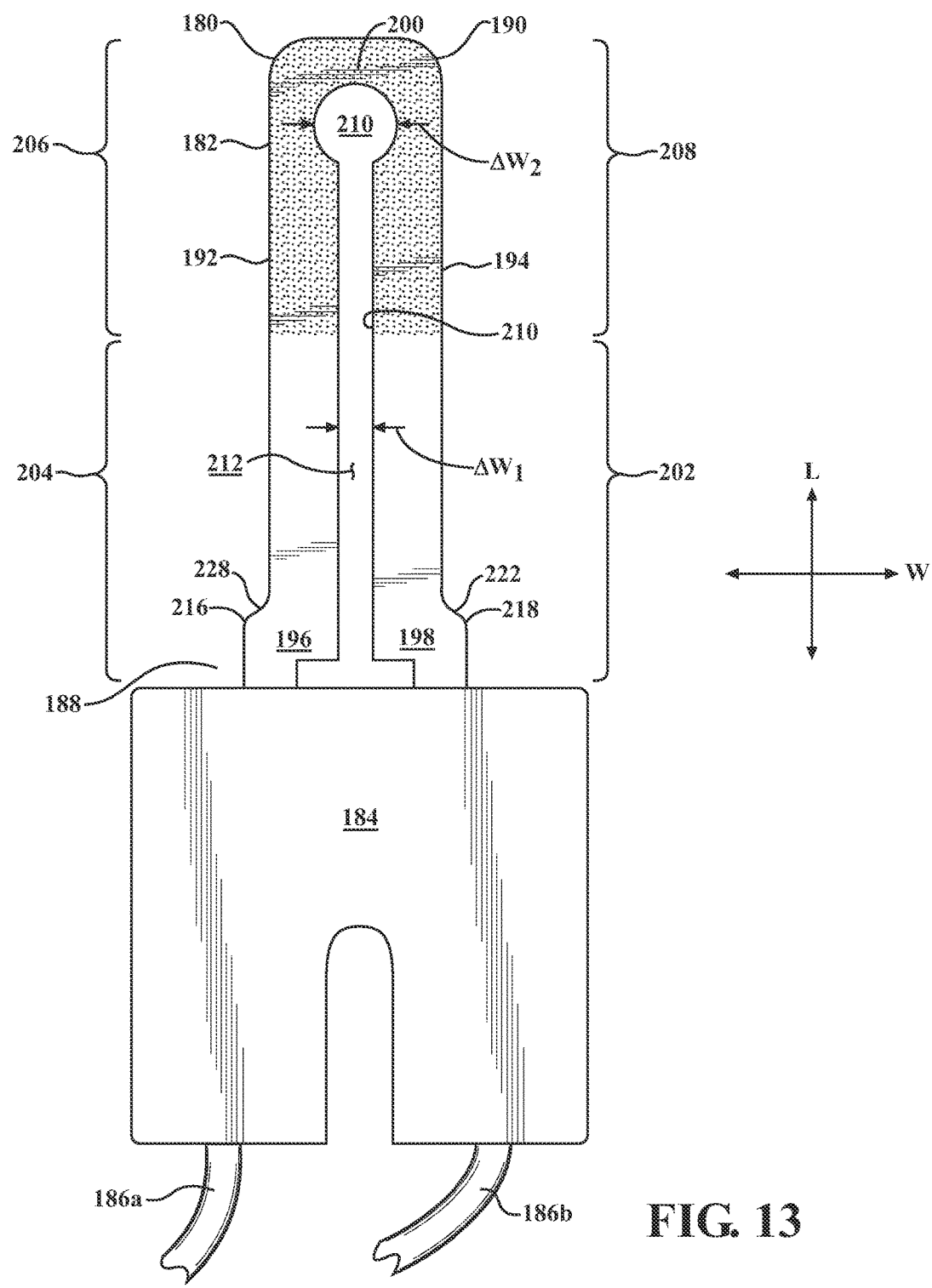
FIG. 13 is a top plan view of a third example of a nitrogen-doped, silicon carbide igniter.

In contrast to known processes, the method of FIG. 8 provides igniter bodies with improved electrical properties (e.g., room and high temperature resistivities) which minimizes or reduces the necessity for creating elongated regions of reduced cross-sectional area. The resulting igniter bodies have improved "strength." As used herein, igniter "strength" may be quantified using a "single point load" test, an "impact test", and a "drop test." Igniter strength is important as igniters are subjected to several events that can cause breakage, including handling before and after shipping, installation, and vibratory shock when moving an appliance in which the igniter is installed. Under the single point load test, an assembled igniter (including the igniter body and terminal block) is subjected to a single point load at the distal end of the igniter body when the assembled igniter is laid on a flat, rigid surface. The load is increased until the igniter fractures. In preferred examples, the method of FIG. 8 is used to prepare a two-leg igniter (FIGS. 10 and 13 depict examples of two leg igniters) for which fracture occurs at a single point load that is no less than about two (2) pounds, preferably no less than about four pounds, and still more preferably no less than about five (5) pounds. In certain preferred examples, single point loads of up to about eight (8) pounds and more preferably up to about ten (10) pounds can be sustained without fracture.

In the "impact test," the terminal block of an assembled igniter is struck along the thickness dimension with a one pound steel weight by allowing the weight to fall onto the terminal block from varying heights until the igniter fractures. In certain preferred examples, two-leg igniters comprising igniter bodies prepared in accordance with the method of FIG. 8 withstand impact from drop heights that are at least about two (2) inches, preferably at least about four (4) inches and more preferably, at least about five (5) inches.

In the "drop test," an assembled igniter is dropped such that the distal end strikes a high density polyethylene surface from heights that are varied until the igniter fractures. In preferred examples, the assembled igniter does not fracture until a drop height of at least four (4) inches, preferably at least about five (5) inches, and more preferably at least about eight (8) inches is used. In some examples, the drop height required to cause fracture is at least about ten (10) inches, preferably at least about fifteen (15) inches, and more preferably at least about twenty (20) inches.

Figure 9:
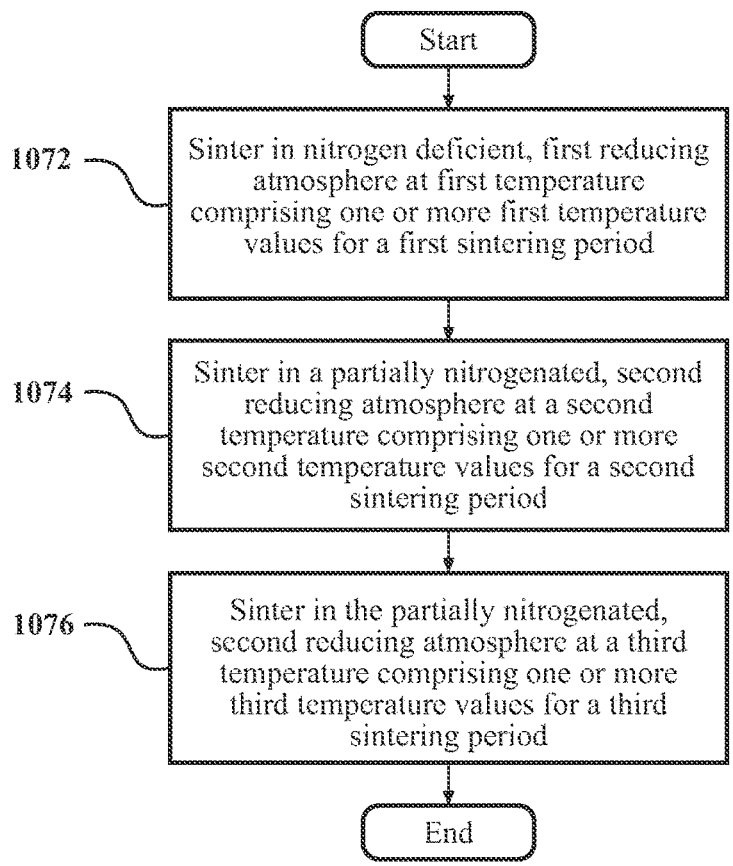
FIG. 9 is a flow chart depicting a fourth method of making a silicon carbide, hot surface igniter body by sintering an unsintered hot surface igniter body in a first, nitrogen depleted reducing atmosphere and in a second, partially-nitrogenated reducing atmosphere.

Referring to FIG. 9, another method of sintering an unsintered, silicon carbide hot surface igniter body is described. The unsintered igniter body may have a relatively resistive composition and a relatively conductive composition of the types described with respect to the method of FIG. 8 or may be carried out on only the relatively resistive composition. In certain preferred examples, the method of FIG. 9 is carried out without using any densification aids. The excluded densification aids include boron carbide, boron nitride, aluminum carbide, carbon, beryllium oxide, hafnium oxide, and yttrium oxide.

In step 1072, the unsintered igniter body is sintered in a first reducing atmosphere that is substantially or entirely devoid of nitrogen at a first sintering temperature comprising one or more first sintering temperature values for a first sintering period. In step 1074, the igniter body is sintered in a partially nitrogenated reducing atmosphere at a second sintering temperature comprising one or more second temperature values for a second sintering period. During each sintering period, the pressure preferably ranges from about 12 psia to about 18 psia, more preferably from about 13 psia to about 17 psia, and still more preferably from about 15 psia to about 16 psia (i.e., from about 0.3 psig to about 1.3 psig).

In step 1076, the igniter body is sintered in the partially nitrogenated, second reducing atmosphere at a third sintering temperature comprising one or more third temperature values for a third sintering period.

In additional examples of step 1072, the first sintering temperature increases from a relatively lower initial value when the reducing atmosphere that is substantially devoid of nitrogen is first introduced into the sintering furnace to relatively higher final value when the partially-nitrogenated reducing atmosphere is introduced in the sintering furnace. In additional examples of step 1074, the second sintering temperature increases from a relatively lower initial value when the partially-nitrogenated reducing atmosphere is introduced in the sintering furnace to a relatively higher final value at which incorporation of nitrogen into the silicon carbide lattice is believed to be substantially complete or complete.

In certain exemplary implementations, step 1072 comprises sintering in the nitrogen-deficient first reducing atmosphere at a first sintering temperature of at least about 2380° C., preferably at least about 2390° C., and more preferably at least about 2400° C. for a first sintering period of at least about 15 minutes, preferably at least about 20 minutes, and more preferably at least about 25 minutes. In such implementations of step 1072, the first sintering temperature is no more than about 2460° C., preferably no more than about 2455° C., and still more preferably no more than about 2450° C. The first sintering period in such exemplary implementations of step 1072 is preferably no more than about 60 minutes, more preferably no more than about 40 minutes, and still more preferably no more than about 35 minutes.

In certain exemplary implementations of step 1074, an unsintered igniter body is sintered in a partially-nitrogenated reducing atmosphere at a second sintering temperature that is at least about 2400° C., preferably at least about 2425° C., and more preferably at least about 2450° C. for a second sintering period of at least about 10 minutes, preferably at least about 12 minutes, and more preferably, at least about 15 minutes. At the same time, the second sintering period in such exemplary implementations of step 1074 is preferably no more than about 90 minutes, more preferably no more than about 70 minutes, and still more preferably no more than about 100 minutes. In accordance with such exemplary implementations of step 1074, nitrogen is preferably not introduced until a sintering temperature of at least about 2400° C., preferably at least about 2425° C., and more preferably at least about 2450° C. is reached.

In additional examples of step 1076, the third sintering temperature is increased from a relatively lower initial value to a maximum value, after which the third sintering temperature is progressively reduced until the furnace heat source is de-energized and the flow of the reducing atmosphere gases into the sintering furnace is discontinued. In other examples, the initial third sintering temperature is the maximum third sintering temperature. In certain preferred examples of step 1076, the third sintering temperature is at least 2500° C. for a period of at least about 30 minutes, preferably at least about 40 minutes, and still more preferably at least about 50 minutes.

The three sintering periods 1072, 1074, and 1076 are characterized by temperature profiles wherein the maximum temperature of a given sintering period is greater than or equal to the maximum temperature of the preceding periods and is greater than the minimum temperature of the preceding periods.

The method of FIG. 9 yields a sintered, hot surface silicon carbide igniter composition that comprises nitrogen. The nitrogen content of the relatively resistive composition is at least about 100 ppm, preferably at least about 200 ppm, and still more preferably at least about 300 ppm by weight of the sintered hot surface igniter body. In the same or other examples the nitrogen content is no more than about 600 ppm, preferably no more than about 550 ppm, and still more preferably no more than about 500 ppm by weight of the distal region of the hot surface igniter body. The relatively resistive sintered igniter composition preferably has a negative temperature coefficient. In certain preferred examples, the relatively resistive sintered silicon carbide compositions prepared in accordance with the method of FIG. 9 have a high temperature resistivity (i.e., at 1000° C.) of from about 0.8 ohm-cm to about 3.5 ohm-cm, preferably from about 1 ohm-cm to about 3 ohm-cm, and more preferably from about 2 ohm-cm to about 2.5 ohm-cm. At the same time, the relatively resistive sintered silicon carbide composition has a room temperature resistivity of at least about 3 ohm-cm, preferably at least about 3.5 ohm-cm, and more preferably at least about 4 ohm-cm. The sintered silicon carbide composition has a room temperature resistivity of no more than about 60 ohm-cm, preferably no more than about 40 ohm-cm, and still more preferably no more than about 20 ohm-cm. The sintered silicon carbide composition has a ratio of room temperature resistivity to high temperature (1000° C.) resistivity that is from about 5 to about 20, preferably from about 8 to about 15, and more preferably from about 10 to about 12. In preferred examples, the relatively resistive silicon carbide composition is essentially or completely free of transition metals and forms the distal part of an igniter body, wherein the proximal part of the igniter body is relatively conductive and comprises silicon carbide and at least one transition metal. Both the relatively resistive and relatively conductive compositions are subjected to the sintering method of FIG. 9. Without wishing to be bound by any theory, it is believed that the at least one transition metal is present as at least one transition metal silicide at the grain boundaries.

Relatively resistive sintered silicon carbide compositions prepared in accordance with the method of FIG. 9 preferably consist essentially of silicon carbide, aluminum, and nitrogen, although transition metals, vanadium, chromium, and oxygen may be present as impurities in trace amounts. Igniter bodies formed from the sintered silicon carbide compositions of the method of FIG. 9 preferably have a density that is at least about 70 percent, preferably at least about 75 percent, and more preferably at least about 80 percent of the theoretical maximum density. The igniter bodies preferably have a density that is no greater than about 90 percent of the theoretical maximum density, more preferably no greater than about 87 percent of the theoretical maximum density, and still more preferably no greater than about 85 percent of the theoretical maximum density.

In addition, relatively resistive sintered silicon carbide compositions prepared in accordance with the method of FIG. 9 preferably have a sintered density that differs from the unsintered density by no more than about five (5) percent, preferably no more than about two (2) percent, and still preferably no more than about one (1) percent. In the same or other examples, igniter bodies formed from silicon carbide igniter compositions prepared in accordance with the method of FIG. 9 have a porosity that is greater than about seven (7) percent, more preferably greater than about ten (10) percent, and still more preferably greater than about fifteen (15) percent.

Igniter bodies having these properties can, in certain examples, be fabricated using only two legs (as shown in FIG. 10) instead of four legs (as shown in FIG. 2) while still providing desired electrical properties. Thus, certain exemplary implementations of the method of FIG. 9 provide igniter bodies with an improved form factor over the prior art. In certain preferred examples, igniter bodies prepared in accordance with the method of FIG. 9 are slotted to provide a two-leg igniter having the igniter strength properties described previously with respect to the method of FIG. 8.

Figure 12:
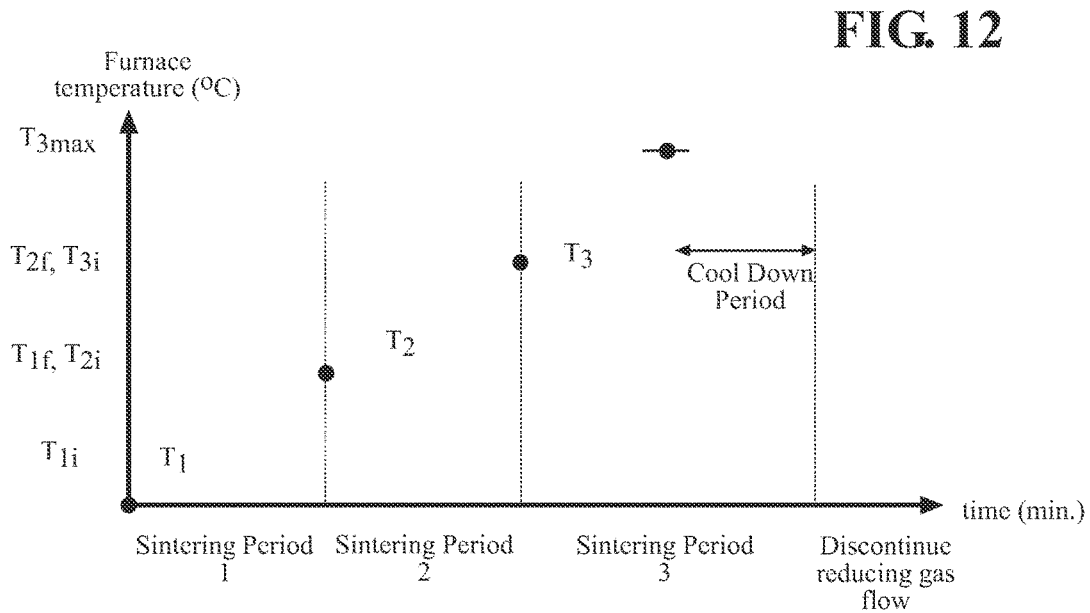
FIG. 12 is a graph depicting temperature and time profiles for first, second, and third sintering periods during the sintering of an unsintered hot surface igniter body in a first, nitrogen depleted reducing atmosphere and in a second, partially-nitrogenated reducing atmosphere.

FIG. 12 illustrates temperature and time values in one implementation of the method of FIG. 9. In accordance with the method, sintering period 1 begins with the introduction of the first reducing atmosphere that is substantially or wholly devoid of nitrogen. During the first sintering period, the first sintering temperature increases from an initial value $T_{1i}$ to a final value $T_{1f}$. The final first temperature value $T_{1f}$ is equal to the initial second temperature value $T_{2i}$ for the second sintering period. The beginning of the second sintering period is initiated by the introduction of a partially-nitrogenated reducing atmosphere into the sintering furnace. In one example, the introduction of the partially-nitrogenated reducing atmosphere is carried out by starting a flow of nitrogen into the sintering furnace while maintaining a flow rate of the inert gas (e.g., argon and/or helium) used to provide the first reducing atmosphere that is substantially or wholly devoid of nitrogen. Sintering period 3 begins at an initial temperature $T_{3i}$ that is the same as the final sintering temperature $T_{2f}$ from the second sintering period. The initial third temperature $T_{3i}$ is preferably selected to increase the oxidation resistance of the igniter body and is generally at a level where incorporation of nitrogen into the lattice of recrystallized silicon carbide is believed to be significantly reduced relative to the initial second sintering temperature value $T_{2i}$.

In certain examples, the initial first temperature value $T_{1i}$ ranges from about 800° C. to about 1000° C., preferably from about 850° C. to about 950° C., and more preferably from about 875° C. to about 925° C. The first sintering period is preferably from about 90 minutes to about 150 minutes, more preferably from about 100 minutes to about 140 minutes, and still more preferably from about 110 minutes to about 130 minutes. In the same or other examples, the final first temperature value $T_{1f}$ and the initial second temperature value $T_{2i}$ ranges from about 2400° C. to about 2525° C., preferably from about 2425° C. to about 2500° C., and more preferably from about 2450° C. to about 2480° C.

In preferred implementations, during the first sintering period, the first sintering temperature is held at a temperature of at least about 2000° C. for a first subperiod of at least about 30 minutes, preferably at least about 35 minutes, and more preferably at least about 40 minutes. During the first subperiod, the first sintering temperature is preferably no more than about 2525° C., more preferably no more than about 2500° C. and still more preferably no more than about 2480° C.

In addition to or in lieu of the first subperiod, during the first sintering period the first sintering temperature may be held at a temperature of at least about 2200° C. for a second subperiod of at least about 15, preferably at least about 20 minutes, and still more preferably, at least about 25 minutes. During the second subperiod, the first sintering temperature is preferably no more than about 2525° C., more preferably no more than about 2500° C. and still more preferably no more than about 2480° C. In certain examples, the second subperiod is preferably no more than about 30 minutes, more preferably no more than about 25 minutes, and still more preferably no more than about 20 minutes.

In addition, during the first sintering period there may also be a third subperiod in addition to or in lieu of either of the first and second subperiods during which the first sintering temperature is at least about 2300° C. for a third subperiod of at least about 5 minutes, preferably at least about 10 minutes, and more preferably at least about 15 minutes. During the third subperiod, the first sintering temperature is preferably no more than about 2525° C., more preferably no more than about 2500° C. and still more preferably no more than about 2480° C. The beginning of the first sintering period occurs when the reducing atmosphere that is substantially or entirely devoid of nitrogen is introduced to the sintering furnace. The first sintering period ends with the introduction of nitrogen to create a partially-nitrogenated reducing atmosphere.

In the same or other examples, the final second temperature value $T_{2f}$ and the initial third temperature value $T_{3i}$ range from about 2475° C. to about 2575° C., preferably from about 2500° C. to about 2550° C., and more preferably from about 2520° C. to about 2530° C. The second sintering period may include one or more subperiods during which the second sintering temperature is held at or above a certain threshold temperature.

The maximum third temperature value $T_{3max}$ ranges from about 2500° C. to about 2550° C., preferably from about 2510° C. to about 2540° C., and still more preferably from about 2520° C. to about 2530° C. The third sintering period is preferably from about 90 minutes to about 240 minutes, more preferably from about 120 minutes to about 210 minutes, and still more preferably from about 160 minutes to about 200 minutes. In certain preferred examples, the maximum temperature during the third sintering period is the same as the initial temperature.

In preferred examples, the third sintering temperature is held at a value of at least about 2500° C., preferably at least about 2510° C., and more preferably at least about 2520° C. for a subperiod that ranges from about 40 minutes to about 80 minutes, preferably from about 50 minutes to about 75 minutes, and still more preferably from about 55 minutes to about 65 minutes. During the subperiod, the third sintering temperature is preferably no greater than about 2550° C., more preferably no greater than about 2540° C., and still more preferably no greater than about 2530° C.

As indicated in FIG. 12, after the third sintering temperature is held at the maximum value (which may equal the initial value) for a selected period of time, a cool down period begins in which the sintering temperature is progressively reduced to a point at which the heating element in the sintering furnace is de-energized. After a particular cool-down temperature threshold is reached, the flow of the inert gases providing the partially-nitrogenated reducing atmosphere is discontinued. During the third sintering period, the third sintering temperature is at least about 200° C., preferably at least about 250° C. and more preferably at least about 300° C.

In certain examples, the first, second, and third sintering periods described in FIGS. 9 and 12 may comprise one or more temperature values. They may also comprise one or more temperature ramps and/or temperature soaks.

Figure 11:
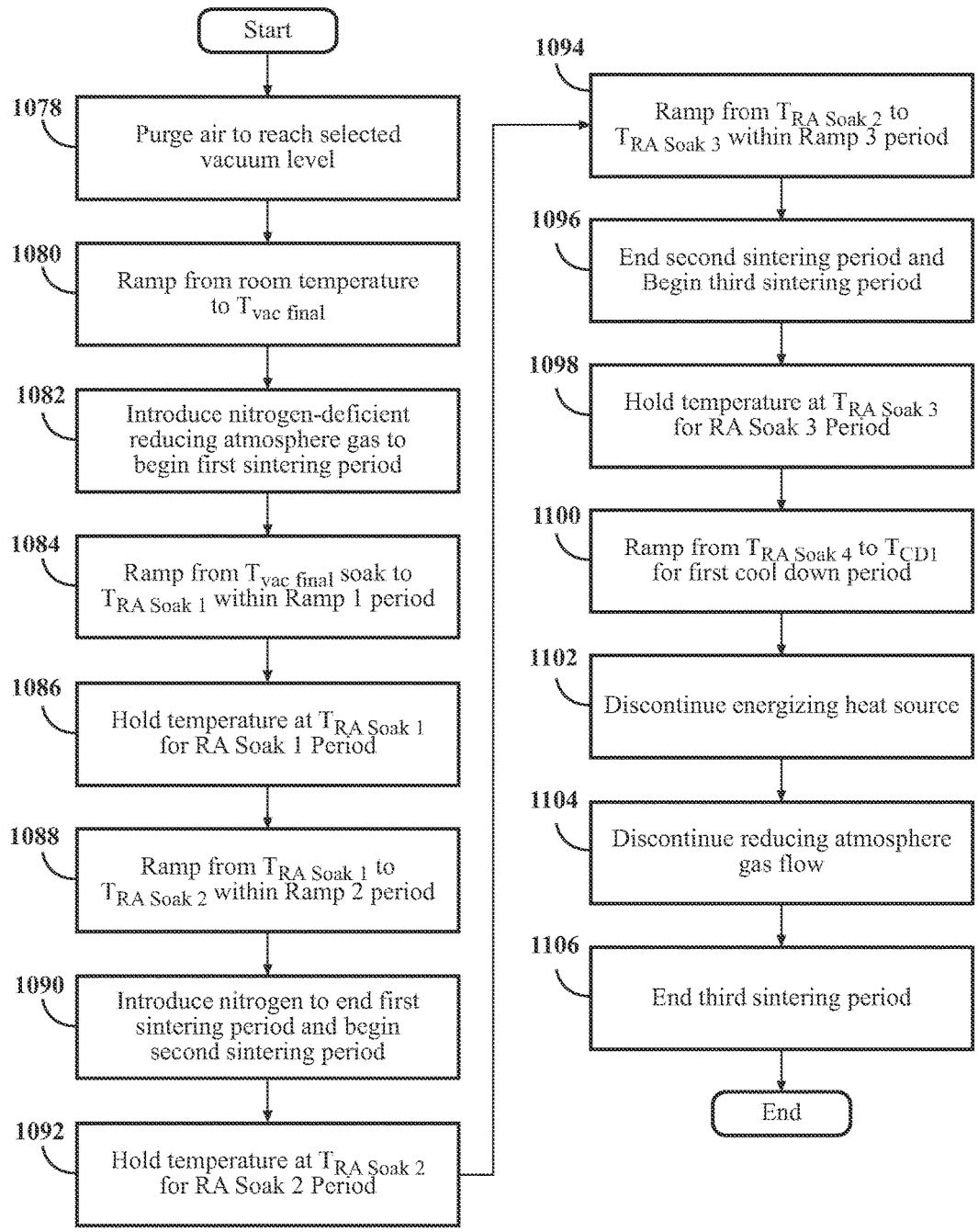
FIG. 11 is a flow chart depicting a fifth method of making a silicon carbide, hot surface igniter body by sintering an unsintered hot surface igniter body in a first, nitrogen depleted reducing atmosphere and in a second, partially-nitrogenated reducing atmosphere.

Another method of sintering an unsintered, silicon carbide, hot surface igniter is depicted in FIG. 11. The unsintered igniter body may have the composition described previously with respect to the methods of FIGS. 8-9. In certain preferred examples, the method of FIG. 11 is carried out without using any densification aids. The excluded densification aids include boron carbide, boron nitride, aluminum carbide, carbon, beryllium oxide, hafnium oxide, and yttrium oxide.

In step 1078 a vacuum system operatively connected to the interior of the sintering furnace (in which a batch of unsintered igniter bodies was previously loaded) is activated to purge air and reduce the air pressure to a value of from about 5 microns of mercury (relative to vacuum) to about 30 microns, preferably from about 10 microns to about 20 microns, and more preferably from about 14 microns to about 16 microns.

The sintering furnace is energized in step 1080 and the sintering furnace temperature is ramped from room temperature to a final vacuum temperature ($T_{vac\ final}$), during a vacuum ramp period. In certain examples, $T_{vac\ final}$ ranges from about 800° C. to about 1000° C., preferably from about 850° C. to about 950° C., and more preferably from about 875° C. to about 925° C. In certain examples, the vacuum ramp period ranges from about 20 minutes to about 70 minutes, preferably from about 30 minutes to about 60 minutes, and more preferably from about 40 minutes to about 50 minutes. The inert gases used to provide a reducing atmosphere that is substantially devoid of nitrogen have not yet been introduced at this point in the method. Once the final vacuum temperature $T_{vac\ final}$ has been reached, in step 1082 a flow of inert gas that is substantially or wholly devoid of nitrogen is introduced into the sintering furnace. The inert gas may comprise, for example, at least one noble gas, such as argon and/or helium. In certain examples, argon is preferred. In one implementation, the inert gas consists essentially of argon. The introduction of the reducing atmosphere begins the first sintering period shown on FIG. 12. During the sintering periods, the pressure preferably ranges from about 12 psia to about 18 psia, more preferably from about 13 psia to about 17 psia, and still more preferably from about 15 psia to about 16 psia (i.e., from about 0.3 psig to about 1.3 psig).

The sintering furnace temperature is ramped from the final vacuum $T_{vac\ final}$ temperature to an initial reducing atmosphere soak temperature ($T_{RA\ Soak\ 1}$) during a first ramp period in step 1084. The first reducing atmosphere soak temperature $T_{RA\ Soak\ 1}$ is preferably from about 2075° C. to about 2125° C., more preferably from about 2080° C. to about 2120° C., and still more preferably from about 2090° C. to about 2110° C. The first ramp period preferably ranges from about 40 minutes to about 120 minutes, more preferably from about 60 minutes to about 100 minutes, and still more preferably from about 75 minutes to about 85 minutes.

In step 1086 the initial reducing atmosphere soak temperature $T_{RA\ Soak\ 1}$ is maintained for a first soak period that ranges from about 1 minute to about 15 minutes, preferably from about 2 minutes to about 10 minutes, and more preferably from about 3 minutes to about 7 minutes.

The first sintering temperature is ramped from the initial reducing atmosphere soak temperature value $T_{RA\ Soak\ 1}$ to a second reducing atmosphere soak temperature value $T_{RA\ Soak\ 2}$ in step 1088. The second reducing atmosphere soak temperature $T_{RA\ Soak\ 2}$ is from about 2400° C. to about 2500° C., preferably from about 2425° C. to about 2490° C. and more preferably from about 2450° C. to about 2485° C.

After a brief soak (not shown in FIG. 11) of between 30 seconds and 2 minutes, nitrogen is introduced into the sintering furnace to provide a partially-nitrogenated reducing atmosphere (step 1090) and begin the second sintering period. The second sintering temperature is held at the second reducing atmosphere soak temperature $T_{RA\ Soak\ 2}$ for a period that is preferably from about 10 minutes to about 60 minutes, more preferably from about 15 minutes to about 50 minutes, and still more preferably from about 25 minutes to about 35 minutes (step 1092).

In step 1094 the sintering temperature is ramped from the second soak temperature $T_{RA\ Soak\ 2}$ to a third soak temperature $T_{RA\ Soak\ 3}$ during a third ramp period that ranges from about 1 minute to about 10 minutes, preferably from about 9 minutes to about 8 minutes, and more preferably form about 4 minutes to about 6 minutes. The attainment of the third soak temperature ends the second sintering period and begins the third sintering period (Step 1096), The third soak temperature is preferably one sufficient to impart oxidation resistance to the igniter body and ranges from about 2475° C. to about 2575° C., preferably from about 2500° C. to about 2550° C., and more preferably from about 2520° C. to about 2530° C. The third soak period in step 1098 is preferably from about 20 minutes to about 120 minutes, more preferably from about 30 minutes to about 90 minutes, and still more preferably from about 50 minutes to about 70 minutes.

At the conclusion of the third soak period, the third sintering temperature is ramped downward from the third soak temperature to a cool down temperature ($T_{CD1}$) during a first cool down period by progressively reducing the heat supplied by the sintering furnace heating element (step 1100). In preferred examples, $T_{CD1}$ ranges from about 1600° C. to about 2000° C., more preferably from about 1700° C. to about 1900° C., and still more preferably from about 1750° C. to about 1850° C. The ramp time in step 1060 is preferably from about 50 minutes to about 90 minutes, more preferably from about 65 minutes to about 80 minutes, and still more preferably from about 70 minutes to about 75 minutes. At the conclusion of the first cool down period, the sintering furnace heating element is de-energized and the sintering furnace temperature is allowed to fall in an unregulated manner until it reaches a gas cessation value (step 1102). During step 1102 the gases comprising the partially-nitrogenated reducing atmosphere continue to flow into the sintering furnace. When the temperature reaches a gas cessation temperature value, the flow of the partially-nitrogenated reducing atmosphere gases is discontinued (step 1104). In certain examples, the gas cessation temperature value is at least about 200° C., preferably at least about 250° C., and more preferably at least about 290° C. At the same time, the gas cessation temperature value is preferably no more than about 400° C., more preferably no more than about 350° C., and still more preferably no more than about 310° C. In step 1106, the third sintering period ends. In certain preferred examples, the method of FIG. 11 is carried out without using any densification aids. The excluded densification aids include boron carbide, boron nitride, aluminum carbide, carbon, beryllium oxide, hafnium oxide, and yttrium oxide.

The method of FIG. 11 yields relatively resistive, sintered, hot surface silicon carbide igniter compositions that comprise nitrogen. The nitrogen content is preferably from about 300 ppm to about 700 ppm by weight, preferably from about 350 ppm to about 650 ppm by weight, and more preferably from about 400 ppm to about 600 ppm by weight of nitrogen. In certain examples, relatively resistive sintered silicon carbide igniter compositions prepared in accordance with the method of FIG. 11 consist essentially of silicon carbide, aluminum, and nitrogen, with trace amounts of oxygen, vanadium, and chromium possibly being present.

In certain preferred examples, the relatively resistive sintered silicon carbide compositions prepared in accordance with the method of FIG. 11 have a high temperature resistivity (i.e., at 1000° C.) of from about 0.8 ohm-cm to about 3.5 ohm-cm, preferably from about 1 ohm-cm to about 3 ohm-cm, and more preferably from about 2 ohm-cm to about 2.5 ohm-cm. At the same time, the sintered silicon carbide composition has a room temperature resistivity of at least about 3 ohm-cm, preferably at least about 3.5 ohm-cm, and more preferably at least about 4 ohm-cm. The relatively resistive sintered silicon carbide composition has a room temperature resistivity of no more than about 60 ohm-cm, preferably no more than about 40 ohm-cm, and still more preferably no more than about 20 ohm-cm. The relatively resistive sintered silicon carbide composition has a ratio of room temperature resistivity to high temperature (1000° C.) resistivity that is from about 5 to about 20, preferably from about 8 to about 15, and more preferably from about 10 to about 12. In preferred examples, the relatively resistive silicon carbide composition is essentially or completely free of transition metals and forms the distal part of an igniter body, wherein the proximal part of the igniter body is relatively conductive and comprises silicon carbide and at least one transition metal, which may be present as a transition metal silicide. Both the relatively resistive and relatively conductive compositions are subjected to the sintering method of FIG. 11.

Relatively resistive sintered silicon carbide compositions prepared in accordance with the method of FIG. 11 preferably consist essentially of silicon carbide, aluminum, and nitrogen, although transition metals, vanadium, chromium, and oxygen may be present as impurities in trace amounts. Igniter bodies formed from the relatively resistive sintered silicon carbide compositions of the method of FIG. 11 preferably have a density that is at least about 70 percent, preferably at least about 75 percent, and more preferably at least about 80 percent of the theoretical maximum density. The igniter bodies preferably have a density that is no greater than about 90 percent of the theoretical maximum density, more preferably no greater than about 87 percent of the theoretical maximum density, and still more preferably no greater than about 85 percent of the theoretical maximum density.

In addition, the relatively resistive sintered silicon carbide compositions prepared in accordance with the method of FIG. 11 preferably have a sintered density that differs from the unsintered density by no more than about five (5) percent, preferably no more than about two (2) percent, and still preferably no more than about one (1) percent. In the same or other examples, igniter bodies formed from silicon carbide igniter compositions prepared in accordance with the method of FIG. 11 have a porosity that is greater than about seven (7) percent, more preferably greater than about ten (10) percent, and still more preferably greater than about fifteen (15) percent.

FIG. 10 depicts a silicon carbide hot surface igniter 80 with a hot surface igniter body 82 made by any of the methods of FIGS. 8, 9, and 11 using the same materials described above for those methods. Hot surface igniter 80 comprises only two legs 92 and 94. Without wishing to be bound by any theory, it is believed that the use of a sintering process in which the recrystallization of silicon carbide fines is carried out in an inert reducing atmosphere that is substantially devoid of nitrogen followed by an inert reducing atmosphere that is partially-nitrogenated provides an improvement the high temperature (1000° C.) resistivity relative to known igniters and those made according to the sintering methods of FIGS. 3-6. At the same time, the sintering process is believed to provide improved room temperature resistivities and ratios of room temperature to high temperature resistivity relative to known igniters and those made according to the sintering methods of FIGS. 3-6.

In certain examples, the foregoing improvement in the ratio of room temperature resistivity to high temperature resistivity allows igniters made in accordance with the method of FIGS. 8, 9, and 11 to be formed with only two legs while still achieving desired electrical properties and still maintaining an overall length, width, and thickness (where the length and width are based on the perimeter of the igniter body) comparable to known silicon carbide igniters. The igniter 80 of FIG. 10 is an example of such a two-leg silicon carbide igniter. Igniter 80 comprises igniter body 82 and terminal block 84. Igniter body 82 has a distal end 90 and a proximal end 88 that are spaced apart long a length axis L. First and second legs 92 and 94 have respective proximal ends 96 and 98. Portions of the proximal ends 96 and 98 are arc sprayed with a nickel alloy and inserted into the terminal block 84 to connect to a respective one of conductors 86a and 86b. The conductors 86a and 86b are connected to opposite terminals of a source of electrical potential. The proximal ends 96 and 98 of first and second legs 92 and 94 are spaced apart from one another along the width axis W. However, the first and second legs 92, 94 share a common distal end 100. The common distal end 100 provides for current flow from the first leg 92 to the second leg 94. The first and second legs 92 and 94 are defined by a central slot 110 extending along the length axis L of the igniter body 82. The central slot 110 includes a generally constant width region 112 that is located proximally of a flared region 114. In the flared region 114, the slot width increases while moving along the length axis L away from the proximal end 88 of the igniter body 82. As a result, the widths of legs 92 and 94 along the width axis W are smaller at the flared region 114 relative to the generally constant width region 112.

Proximal leg end 96 has a shoulder 116 which is connected to a distally-adjacent concave region 124. The concave region 124 is connected to a distally-adjacent straight region 126, which is connected to a distally-adjacent sloped region 128. Similarly, proximal leg end 98 has a shoulder 118 that is connected to a distally-adjacent concave region 124. Concave region 124 is connected to a distally-adjacent straight region 120, which is connected to a distally-adjacent sloped region 122.

In the example of FIG. 10, the igniter body 82 has a varying composition along the length axis L. Igniter body legs 92 and 94 comprise first respective proximal leg regions 104 and 102 and second respective distal regions 106 and 108 which have different compositions from one another. The distal regions 106 and 108 are formed with a higher resistivity than their corresponding proximal leg regions 104 and 102. In certain applications, the varying resistivities are used to regulate the current draw of the igniter 80 at a particular service voltage.

In certain examples of where igniter of FIG. 10 is prepared according to the methods of FIG. 8, 9, or 11, the distal regions 106, 108 have a high temperature resistivity (i.e., at 1000° C.) of from about 0.8 ohm-cm to about 3.5 ohm-cm, preferably from about 1 ohm-cm to about 3 ohm-cm, and more preferably from about 2 ohm-cm to about 2.5 ohm-cm. At the same time, the distal regions 106, 108 have a room temperature resistivity of at least about 3 ohm-cm, preferably at least about 3.5 ohm-cm, and more preferably at least about 4 ohm-cm. The distal regions 106, 108 have a room temperature resistivity of no more than about 60 ohm-cm, preferably no more than about 40 ohm-cm, and still more preferably no more than about 20 ohm-cm. The distal regions 106, 108 have a ratio of room temperature resistivity to high temperature (1000° C.) resistivity that is from about 5 to about 20, preferably from about 8 to about 15, and more preferably from about 10 to about 12. In preferred examples, the distal regions 106, 108 are essentially or completely free of transition metals.

In one preferred example, the proximal regions 104 and 102 are formed with a conductive material added to the same material used to form the distal regions 106 and 108. Suitable conductive materials include transition metal silicides and transition metal silicide formers, wherein the transition metal is selected from the group consisting of tantalum (Ta), tungsten (W), molybdenum (Mo), zirconium (Zr), titanium (Ti), iron (Fe), and nickel (Ni). Suitable transition metal silicide formers are preferably selected from the group consisting of oxides, carbides, salts, and the transition metal itself. In certain examples, molybdenum disilicide is especially preferred. In certain exemplary implementations, proximal regions 104 and 102 have a room temperature resistivity that is less than about 1.5 ohm-cm, preferably less than about 1.0 ohm-cm, and more preferably less than about 0.6 ohm-cm. In such implementations, proximal regions 104 and 102 have a high temperature (1000° C.) resistivity that is less than about 0.50 ohm-cm, preferably less than about 0.4 ohm-cm, and more preferably less than about 0.3 ohm-cm. In accordance with the same exemplary implementations, the proximal regions 104 and 102 have a ratio of room temperature resistivity to high temperature resistivity that ranges from about 1.0 to about 4.0, preferably from about 1.5 to about 3.0, and more preferably from about 2.0 to about 2.5.

The at least one transition metal provided in proximal regions 102, 104 is preferably included in the green (unsintered) igniter body as at least one transition metal silicide or at least one transition metal silicide former, and even more preferably is added to an aqueous slurry of silicon carbide, water, and a latex binder in a manner that creates a composition profile within the slurry and within the resulting individual green igniter bodies produced by air curing the slurry (FIG. 1). The unsintered igniter body can be created with foregoing composition profile using a number of processes, including slip casting, injection molding, dip coating, pressing, infiltration, tape casting, and combinations thereof. However, without wishing to be bound by any theory, it is believed that the introduction of the at least one transition metal silicide or transition metal silicide former in the unsintered (green) igniter body as opposed to post-sintering processes such as infiltration results in the permeation of at least one transition metal silicide into the silicon carbide grain boundaries. It is further believed that the introduction of the at least one transition metal silicide or transition metal silicide former in the green igniter body allows for a more modest and controlled increase in conductivity in the proximal leg regions 102 and 104 than would be possible by introducing the compound following sintering.

The distal regions 106 and 108 of the legs 92 and 94 comprise silicon carbide in an amount that is at least about 90 percent, preferably at least about 95 percent, and more preferably at least about 99 percent by weight of the distal regions 106 and 108. In certain preferred examples, the sintered igniter body includes aluminum. When aluminum is present, it is preferably present in an amount (on an aluminum atomic basis by weight of distal regions 106 and 108) that is at least about 200 ppm, preferably at least about 300 ppm, more preferably at least about 400 ppm, and still more preferably at least about 450 ppm. In the same or other examples, the amount of aluminum in the distal regions 106 and 108 is no greater than about 1000 ppm, preferably no greater than about 800 ppm, more preferably no greater than about 600 ppm, and still more preferably no greater than about 550 ppm by weight of the distal regions 106 and 108. The distal regions 106 and 108 also comprise nitrogen in an amount of at least about 100 ppm, preferably at least about 200 ppm, and still more preferably at least about 300 ppm by weight of the distal regions 106 and 108. In the same or other examples the distal regions 106 and 108 of the sintered hot surface igniter body have a nitrogen content of no more than about 600 ppm, preferably no more than about 550 ppm, and still more preferably no more than about 500 ppm by weight of the distal region of the hot surface igniter body. In certain examples, the distal regions 106 and 108 consist essentially of silicon carbide, aluminum, and nitrogen in the foregoing amounts.

The proximal leg regions 102 and 104 comprise silicon carbide in an amount that is at least about 87 percent, preferably at least about 93 percent, and even more preferably at least about 97 percent by weight of the proximal region. The proximal leg regions also contain at least one transition metal in an amount ranging by weight of the transition metal (on an atomic basis) of from about 1.3 percent to about thirteen (13) percent, preferably from about 1.9 percent to about 9.5 percent, and still more preferably from about 3.2 percent to about 6.3 percent. Without wishing to be bound by any theory, the transition metal is believed to be in the form of a transition metal silicide present in an amount (of the transition metal silicide compound) ranging from about two (2) to about twenty (20) percent, preferably from about three (3) percent to about fifteen (15) percent, and still more preferably from about five (5) percent to about ten (10) percent by weight of the proximal leg regions. The amount of nitrogen in the proximal leg regions 102 and 104 is at least about 300 ppm, preferably at least about 350 ppm, and more preferably at least about 400 ppm. At the same time, the amount of nitrogen in the proximal leg regions 102 and 104 is no more than about 700 ppm, preferably no more than about 650 ppm, and still more preferably no more than about 600 ppm. In certain examples, the length of the proximal leg regions 102 and 104 is from about 15 percent to about 70 percent, preferably from about 20 percent to about 60 percent, and more preferably from about 30 percent to about 50 percent of the length of igniter body 82 along the length axis.

Because they allow for the use of two legs instead of four, certain exemplary implementations of the method of FIG. 9 also provide improved igniter strength relative to known silicon carbide igniter fabrication methods. Thus, the methods can be used to form a two-leg igniter such as the igniter of FIG. 10. Under the single point load test, the two leg igniter 80 of FIG. 10 is subjected to a single point load at distal end 100. The load is increased until the igniter 80 fractures. In preferred examples, fracture occurs at a single point load that is no less than about two (2) pounds, preferably no less than about four pounds, and still more preferably no less than about five (5) pounds. In certain preferred examples, single point loads of up to about eight (8) pounds and more preferably up to about ten (10) pounds can be sustained without fracture.

In the "impact test," the terminal block 84 of an assembled igniter 90 is struck along the thickness dimension with a one pound steel weight by allowing the weight to fall onto the terminal block 84 (made of alumina) from varying heights until the igniter 90 fractures. In certain preferred examples, igniter 90 withstands impact from drop heights that are at least about two (2) inches, preferably at least about four (4) inches and more preferably, at least about five (5) inches.

In the "drop test," an assembled igniter 80 is dropped such that the distal end 100 strikes a high density polyethylene surface from heights that are varied until the igniter fractures. In preferred examples, igniter 80 does not fracture until a drop height of at least four (4) inches, preferably at least about five (5) inches, and more preferably at least about eight (8) inches is used. In some examples, the drop height required to cause fracture is at least about ten (10) inches, preferably at least about fifteen (15) inches, and more preferably at least about twenty (20) inches.

Different igniter applications may have different operating temperature and current requirements as well as different service voltages. The methods of FIGS. 8, 9, and 11 and the igniter body design of FIG. 10 may be used to provide igniter bodies that are adjusted to particular applications. The degree of nitrogen incorporation into the lattice may be controlled to adjust the igniter temperature and current draw (at a particular service voltage) by adjusting the nitrogen concentration or the nitrogen partial pressure in the reducing atmosphere. It may also be controlled by varying the sintering temperature at which nitrogen is introduced into the reducing atmosphere. In addition, for a given igniter length, adjusting the height of the relatively conductive proximal regions 102 and 104 in relation to the relatively resistive distal regions 106 and 108 will vary the igniter operating temperature and current draw. The same variables may also be manipulated to provide a desired degree of igniter strength.

Referring to FIG. 13, another example of a silicon carbide hot surface igniter 180 comprising a sintered silicon carbide hot surface igniter body 182 prepared in accordance with any of the methods of FIGS. 8, 9, and 11 is depicted. Igniter body 182 is similar to the igniter body 82 of FIG. 10 in that igniter body 182 comprises two legs 192 and 194. However, central slot 210 of FIG. 13 is configured differently than central slot 110 of FIG. 10. Central slot 210 defines first and second legs 192 and 194 and comprises a generally straight region 212 and a non-linear region 214. Non-linear region 214 does not include any linear sides and may include a variety of non-linear shapes, including circles, ovals, ellipses, and tear drop shapes. In the illustrated example of FIG. 13, non-linear region 214 is circular. Non-linear region 214 has a maximum slot width $\Delta W_2$ that is greater than the maximum slot width $\Delta W_1$ in the generally straight region 212. Without wishing to be bound by any theory, it is believed that for an igniter body of a particular composition and overall size (as defined by the perimeter of the igniter body), the use of a non-linear region 214 as part of central slot 210 allows a given sintered silicon carbide igniter composition to be formed into an igniter body in which the spacing $\Delta W_1$ between legs 192 and 194 in the straight region is reduced as compared to design in which the non-linear region 214 is not provided. Thus, in the slotting process, an area of reduced cross-sectional area normal to current flow is concentrated in one region along the length of the igniter body 182, allowing the leg spacing $\Delta W_2$ to be reduced. As a result, igniter bodies using the non-linear slot region 214 are generally believed to be stronger because the widths of the individual legs 192 and 194 are generally greater in the region proximal of the non-linear slot region 214. Thus, as compared to igniters with the central slot 110 of FIG. 10, those using a non-linear slot region 214 such as is depicted in FIG. 13 are believed to be stronger.

In FIG. 13, igniter body 182 comprises a proximal end 188 and a distal end 190. Legs 192 and 194 have respective proximal ends 196 and 198 which are spaced apart from one another along the width axis W. Leg 192 has a proximal region 204 and an adjacent distal region 206. Leg 198 has a proximal region 202 and a distal region 208. Portions of the proximal ends 196 and 198 which are not visible are electrically connected to conductors 186a and 186b, respectively, in terminal block 184. The portions are of the proximal ends 196 and 198 are preferably arc sprayed with a nickel alloy to facilitate the electrical connection to conductors 186a and 186b.

Legs 192 and 194 share a common distal region 200, but have proximal ends 196 and 198 that are not connected. The common distal region 200 provides a path for current flow from leg 192 to leg 194. Proximal leg end 196 includes a shoulder 216 and a sloped region 228. Similarly, proximal leg end 198 includes a shoulder 218 and a sloped region 222.

As with the igniter body 82 of FIG. 10, the igniter body 182 of FIG. 13 has a varying composition along the length axis L. First respective proximal leg regions 204 and 202 and second respective distal regions 206 and 208 have different compositions from one another. The distal regions 206 and 208 are formed with a higher resistivity material than their corresponding proximal leg regions 204 and 202. In certain applications, the varying resistivities are used to regulate the current draw of the igniter 180 at a particular service voltage.

In certain examples where the igniter of FIG. 13 is prepared in accordance with any of the methods of FIGS. 8, 9, and 11, the distal regions 206, 208 have a high temperature resistivity (i.e., at 1000° C.) of from about 0.8 ohm-cm to about 3.5 ohm-cm, preferably from about 1 ohm-cm to about 3 ohm-cm, and more preferably from about 2 ohm-cm to about 2.5 ohm-cm. At the same time, the distal regions 206, 208 have a room temperature resistivity of at least about 3 ohm-cm, preferably at least about 3.5 ohm-cm, and more preferably at least about 4 ohm-cm. The distal regions 206, 208 have a room temperature resistivity of no more than about 60 ohm-cm, preferably no more than about 40 ohm-cm, and still more preferably no more than about 20 ohm-cm. The distal regions 206, 208 have a ratio of room temperature resistivity to high temperature (1000° C.) resistivity that is from about 5 to about 20, preferably from about 8 to about 15, and more preferably from about 10 to about 12. In preferred examples, the distal regions 206, 208 are essentially or completely free of transition metals and forms the distal part of an igniter body, wherein the proximal regions 204 and 202 of the igniter body comprises silicon carbide and at least one transition metal.

In one preferred example, the proximal regions 204 and 202 are formed with a conductive material that is added to the same material used to form the distal regions 206 and 208. Suitable conductive materials include transition metal silicides and transition metal silicide formers, wherein the transition metal is preferably selected from the group consisting of tantalum (Ta), tungsten (W), molybdenum (Mo), zirconium (Zr), titanium (Ti), iron (Fe), and nickel (Ni). Suitable transitional metal silicide formers are preferably selected from the group consisting of oxides, carbides, salts, and the metal itself. Suitable salts include nitrates. In certain examples, the transition metal silicide molybdenum disilicide is especially preferred. In certain exemplary implementations, proximal regions 104 and 102 have a high temperature (1000° C.) resistivity that is less than about 1.5 ohm-cm, preferably less than about 1.0 ohm-cm, and more preferably less than about 0.6 ohm-cm. In such implementations, proximal regions 204 and 202 have a room temperature resistance that is less than about 0.50 ohm-cm, preferably less than about 0.4 ohm-cm, and more preferably less than about 0.3 ohm-cm. In accordance with the same exemplary implementations, the proximal regions 204 and 202 have a ratio of room temperature resistivity to high temperature resistivity that ranges from about 1.0 to about 4.0, preferably from about 1.5 to about 3.0, and more preferably from about 2.0 to about 2.5.

In accordance with one implementation, the distal regions 206 and 208 comprise silicon carbide, aluminum, iron, and nitrogen, but are substantially or wholly devoid of transition metals while the proximal regions comprise silicon carbide, aluminum, at least one transition metal (which may be present as a transition metal silicide) and nitrogen. To provide at least one transition metal in the proximal region following sintering, at least one transition metal silicide or silicide former is preferably included in the green (unsintered) igniter body, and even more preferably is added to an aqueous slurry of silicon carbide, aluminum oxide, water, and a latex binder in a manner that creates a composition profile within the slurry and within the resulting individual green igniter bodies produced by air curing the slurry (FIG. 1). Without wishing to be bound by any theory, it is believed that the introduction of the at least one transition metal silicide or transition metal silicide former in the unsintered (green) igniter body as opposed to post-sintering processes such as infiltration results in the permeation of transition metal silicide into the silicon carbide grain boundaries. It is further believed that the introduction of the at least one transition metal silicide in the green igniter body allows for a more modest and controlled increase in conductivity in the proximal leg regions 102 and 104 than would be possible by introducing the compound following sintering. Suitable transition metals in the at least one transition metal silicide or transition metal silicide former are preferably selected from the group consisting of tantalum (Ta), tungsten (W), molybdenum (Mo), zirconium (Zr), titanium (Ti), iron (Fe), and nickel (Ni). Suitable transitional metal silicide formers are preferably selected from the group consisting of oxides, carbides, salts, and the transition metal itself. Suitable salts include nitrates.

The distal regions 206 and 208 of the legs 92 and 94 comprise silicon carbide in an amount that is at least about 90 percent, preferably at least about 95 percent, and more preferably at least about 99 percent by weight of the distal regions 206 and 208. In certain preferred examples, the sintered igniter body includes aluminum. When aluminum is present, it is preferably present in an amount that is at least about 200 ppm, preferably at least about 300 ppm, more preferably at least about 400 ppm, and still more preferably at least about 450 ppm. In the same or other examples, the amount of aluminum (on an aluminum atomic basis) in the distal regions 206 and 208 is no greater than about 1000 ppm, preferably no greater than about 800 ppm, more preferably no greater than about 600 ppm, and still more preferably no greater than about 550 ppm by weight of the distal regions 206 and 208. The distal regions 206 and 208 also comprise nitrogen in an amount of at least about 300 ppm, preferably at least about 350 ppm, and still more preferably at least about 400 ppm by weight of the sintered hot surface igniter body. In the same or other examples, nitrogen content of the distal regions 206 and 208 is no more than about 700 ppm, preferably no more than about 650 ppm, and still more preferably no more than about 600 ppm by weight of the sintered hot surface igniter body. In certain examples, the distal regions 206 and 208 consist essentially of silicon carbide, aluminum, and nitrogen in the foregoing amounts.

The proximal leg regions 202 and 204 comprise silicon carbide in an amount that is least about 87 percent, preferably at least about 93 percent, and even more preferably at least about 97 percent by weight of the proximal region.

The proximal leg regions 202 and 204 also contain at least one transition metal in an amount (on an atomic basis of the at least one transition metal) ranging from about 1.3 to about thirteen (13), preferably from about 1.9 to about 9.5, and still more preferably from about 3.2 to about 6.4 percent by weight of the proximal leg region. Without wishing to be bound by any theory, it is believed that the at least one transitional metal is present as at least one transition metal silicide and is present in an amount (of the at least one transition metal silicide compound) of from about two (2) to about twenty (20) percent, preferably from about three (3) percent to about fifteen (15) percent, and still more preferably from about five (5) percent to about ten (10) percent by weight of the proximal leg regions. Proximal leg regions 202 and 204 preferably contain nitrogen in the amounts described above for distal leg regions 206 and 208. In preferred examples, proximal leg regions 202 and 204 consist essentially of silicon carbide, and nitrogen in the foregoing amounts. In certain examples, the length of the proximal leg regions 202 and 204 is from about 15 percent to about 70 percent, preferably from about 20 percent to about 60 percent, and more preferably from about 30 percent to about 50 percent of the length of igniter body 182 along the length axis.

In each of the previous embodiments, the extent of nitrogen incorporation into the silicon carbide lattice is controlled, in part, by adjusting the concentration of nitrogen while keeping the total reducing gas pressure in the sintering furnace at atmospheric pressure. The inclusion of an inert gas, such as a noble gas, allows the concentration—and hence the partial pressure—of nitrogen to be varied.

As discussed previously, the igniters 80 and 180 of FIGS. 10 and 13 include relatively conductive regions 102, 202, 104, 204 and relatively resistive regions 106, 206, 108, 208. In those examples, the variations in conductivity and resistivity are provided by adding a conductive material such as a transition metal silicide to the proximal regions 102, 202, 104, 204. However, other techniques may be used. For example, other techniques that prevent the distal regions 106, 206, 108, and 208 from being nitrogen-doped for some period during the sintering process in which the proximal regions 102, 202, 104, 204 are nitrogen doped may also be used to provide distinct relatively conductive regions 102, 202, 104, 204 and relatively resistive regions 106, 206, 108, and 208.

EXAMPLE 1

This first example demonstrates an implementation of the methods of FIGS. 3-6. High purity green silicon carbide, aluminum oxide, iron oxide (a transition metal silicide former), a latex binder are combined to form aqueous slurries with varying levels of iron oxide (0.0%, 0.15% and 0.45%), 0.15% aluminum oxide and 1.5% latex binder, (by weight and on a water-free basis, i.e., after air curing). The balance is silicon carbide which comprises a coarse portion and a fines portion. The coarse fraction is 100F and the fine fraction has a D50 (median) of 2.5-3.0 microns. The coarse portion comprises 50 percent by weight of the total amount of silicon carbide, and the fines portion comprises 50 percent by weight of the total amount of silicon carbide. The slurries are poured into molds having the overall profile of the igniter body 22 of FIG. 2 (i.e., without slots 40, 42, or 43) and air cured to form several billets.

The slurries are poured into molds having the overall profile of the igniter body 22 of FIG. 2 (i.e., without slots 40, 42, or 43) and air cured to form several billets. The billets are sliced into 2000 individual igniter bodies, which are loaded into a sintering furnace that is initially open to the atmosphere and at room temperature. The air in the furnace is evacuated by a vacuum generator that is in fluid communication with the interior of the furnace to reach a level of 15 microns of mercury (vacuum).

The sintering furnace heating element is energized and placed on temperature control to control the temperature in the interior of the furnace. The temperature is ramped from room temperature to an initial reducing atmosphere temperature ($T_{1i}$ in FIG. 7) of 1100° C. at a ramp rate of 15° C./min. Starting at a room temperature of 25° C., the ramp period is 1/15 (1100-25)=72 minutes.

Once the initial reducing atmosphere temperature $T_{1i}$ is reached, the sintering furnace is backfilled with a 100 percent argon to reach a pressure of 1 psig in the furnace interior. A steady flow of a mixture of 50 mole percent nitrogen and 50 mole percent argon is then provided into and out of the furnace, with an inlet flow rate of 3.5 liters/minute. The introduction of the inert gases and the creation of the reducing atmosphere marks the beginning of the first sintering period.

The first sintering temperature is ramped from its initial value of 1100° C. to a first reducing atmosphere soak temperature $T_{RA\ Soak\ 1}$ of 2100° C. at a first ramp rate of 10° C./minute, which corresponds to a first ramp period of 100 minutes. A thermocouple in the sintering furnace is initially used to obtain sintering temperature measurements. However, once the first sintering temperature reaches 1100° C., an optical pyrometer is used.

The first reducing atmosphere soak temperature ($T_{RA\ Soak\ 1}$) of 2100° C. is maintained for a first reducing atmosphere soak period of 5 minutes. Following the first reducing atmosphere soak period, the first sintering temperature is ramped from the first reducing atmosphere soak temperature ($T_{RA\ Soak\ 1}$) to a second reducing atmosphere soak temperature ($T_{RA\ Soak\ 2}$) of 2500° C. by ramping from 2100° C. to 2500° C. at a second ramp rate of 8° C./min during a second ramp period of 50 minutes. The second reducing atmosphere soak temperature $T_{RA\ Soak\ 2}$ is the final first sintering temperature $T_{1f}$ and the initial second sintering temperature $T_{2i}$ (FIG. 7).

The second reducing atmosphere soak temperature $T_{RA\ Soak\ 2}$ is maintained for a second soak period of 60 minutes. Next, a cool down period begins, and the second sintering temperature is ramped downward from 2500° C. to 1800° C. at a ramp rate of 10° C./minute, which corresponds to a ramp period of 70 minutes. The sintering furnace heating element is then de-energized, allowing the sintering furnace temperature to fall in an unregulated manner. Once the second sintering temperature reaches 300° C., the flow of nitrogen and argon is discontinued, and the reducing atmosphere is evacuated until a slight vacuum is achieved.

The resulting igniter body is formed into the serpentine design of FIG. 2. Portions of the proximal ends 56 and 58 (not visible in FIG. 2) are arc sprayed with nickel to a length of about 0.5 inches and are inserted into terminal block 24 to connect to conductors 26a and 26b, respectively. A resistance across the proximal ends 56, 58, of the igniter body 30 is determined, and based on the resistance, resistivities are determined using Equation (2). The resulting room temperature resistivity is 0.38 ohm-cm, and the resulting high temperature (1000° C.) resistivity is 0.18 ohm-cm.

The resulting igniter 180 sustains a single point load (at the tip of region 46) of 0.15 to 1.5 pounds at failure. Under the impact test described previously, the igniter 180 sustains an impact of a one pound steel weight dropped from a height of less than one inch until failure. The drop test drop height of the igniter 180 is less than three (3) inches. All three levels of iron oxide had good speed at 102V with room temperature resistances of <100 ohms and maximum temperature at 132V of less than 2900F. The 0.45% level of iron oxide gave abbreviated application life due to accelerated oxidation.

EXAMPLE 2

This second example illustrates an implementation of the methods of FIGS. 8-9, and 11. Silicon carbide, 0.15% aluminum oxide, 1.5% latex resin (by weight and on a water-free basis, i.e., after air curing), and water are combined to make a first aqueous slurry used to form the distal leg regions 106 and 108 of FIG. 10. The balance is silicon carbide which comprises a coarse portion and a fines portion. The coarse fraction is 100F and the fine fraction has a D50 (median) of 2.5-3.0 microns. The coarse portion comprises 50 percent by weight of the total amount of silicon carbide, and the fines portion comprises 50 percent by weight of the total amount of silicon carbide. Silicon carbide, 0.15% aluminum oxide, 5% molybdenum disilicide (a transition metal silicide), 1.5% latex resin (by weight on a water free basis, i.e. after air curing), and water are used to make a second aqueous slurry used to form the proximal leg regions 102 and 104 of FIG. 10. The balance is silicon carbide which comprises a coarse portion and a fines portion. The coarse fraction is 100F and the fine fraction has a D50 (median) of 2.5-3.0 microns. The coarse portion comprises 50 percent by weight of the total amount of silicon carbide, and the fines portion comprises 50 percent by weight of the total amount of silicon carbide. Individual igniter molds are created with a shape corresponding to the igniter body 82. In this case, the mold defines the inter-leg spacing 110. The first aqueous slurry is poured into a distal portion of the mold corresponding to distal leg portions 106 and 108, and the second aqueous slurry is poured in to a proximal portion of the mold corresponding to proximal leg regions 102 and 104. The slurries are then air cured, and the resulting unsintered hot surface igniter bodies are removed. 600 green igniter bodies prepared in accordance with the foregoing technique are loaded into a sintering furnace.

The sintering furnace heating element is energized and placed on temperature control to control the temperature in the interior of the furnace. The temperature is ramped from room temperature to a maximum vacuum temperature $T_{vac\ max}$ of 900° C. at a ramp rate of 20° C./min. Starting at a room temperature of 70° F. (21° C.), the ramp period is 1/20 (900-21)=44 minutes.

Once the maximum vacuum temperature $T_{vac\ max}$ of 900° C. is reached, the furnace is provided with a reducing atmosphere that is substantially devoid of nitrogen (except for possibly very small amounts of residual air by backfilling the furnace with 100% argon). A flow of 100% argon to the furnace is then initiated through the furnace at a rate of 5 liters/minute. The backfilling process is carried out to create a pressure of about 1 psig in the furnace. With the introduction of argon, the first sintering period begins at a first sintering temperature of 900° C., which is the maximum temperature reached during the vacuum period ($T_{vac\ max}$). In FIG. 12, the temperature of 900° C. corresponds to $T_{1i}$.

The first sintering temperature of 900° C. is ramped to a first reducing atmosphere soak temperature $T_{RA\ Soak\ 1}$ of 2100° C. at a rate of 15° C./minute during a first ramp period of 80 minutes. Once reached, the first soak temperature $T_{RA\ Soak\ 1}$ is held for a first soak period of 5 minutes. The first sintering temperature is then ramped from the first soak temperature $T_{RA\ Soak\ 1}$ to a second soak temperature $T_{RA\ Soak\ 2}$ of 2475° C. at a ramp rate of 10° C./minute during a second ramp period of 37.5 minutes.

Once the second soak temperature $T_{RA\ Soak\ 2}$ of 2475° C. is reached, it held for a second soak period of 1 minute, after which a partially-nitrogenated reducing atmosphere of 25 percent nitrogen and 75 percent argon is provided by initiating a flow of nitrogen to the sintering furnace as the argon continues to flow. The flow rate of the nitrogen and argon combined is 7 liters per minute. The introduction of nitrogen begins the second sintering period at an initial second sintering temperature ($T_{2i}$ in FIG. 12) that is the second soak temperature $T_{RA\ Soak\ 2}$ of 2475° C.

During the second sintering period, the second soak temperature $T_{RA\ Soak\ 2}$ is held for a third soak period of 30 minutes. The second sintering temperature is then ramped from the second soak temperature $T_{RA\ Soak\ 2}$ of 2475° C. to a third soak temperature $T_{RA\ Soak\ 3}$ of 2525° C. The attainment of the third soak temperature of 2525° C. begins the third sintering period, with the initial third sintering temperature ($T_{3i}$ in FIG. 12) being the third soak temperature of 2525° C. While FIG. 3 shows a maximum third sintering period temperature $T_{3max}$ that is greater than the initial third sintering period temperature of $T_{3i}$, in this example, the two values are the same. The third soak temperature $T_{RA\ Soak\ 3}$ of 2525° C. is held for a fourth soak period of 60 minutes.

Following the fourth soak period, a cool down period begins by ramping the third sintering temperature from the third soak temperature $T_{RA\ Soak\ 3}$ of 2525° C. to 1800° C. at a ramp rate of 10° C./min during a ramp period of 72.5 minutes. The sintering furnace heating element is then de-energized, allowing the sintering furnace temperature to fall in an unregulated manner. Once the second sintering temperature reaches 800° C., the flow of nitrogen and argon is discontinued, and the reducing atmosphere is evacuated until a slight vacuum is achieved.

The igniter body is cut into the shape shown in FIG. 13 and the proximal ends of legs 192 and 194 are arc sprayed with nickel along about 0.5 inch of the igniter body length. The proximal ends (not visible in FIG. 13) are connected to conductors 186a and 186b in terminal block 184. The assembly has a room temperature resistivity of 3.57 ohm-cm, and a 1000° C. resistivity of 1.17 ohm-cm. The length of proximal regions 202/204 along the length axis is about 52 percent of the total length of proximal regions 202/204 and distal regions 206/208 combined along the length axis.

In order to determine the resistivities of the distal leg regions 206 and 208 and the proximal leg regions 204 and 202, a first igniter body is prepared using only the composition of distal leg regions 206 and 208 and the foregoing process. A second igniter body is prepared using only the composition of the proximal leg regions 204 and 202 and the foregoing process. Resistances are measured across each body, and both room and high temperature resistivities are determined for each body using equation (2). Using this technique, the high temperature (1000° C.) resistivity of the distal regions 206 and 208 is estimated to be about 2.14 ohm-cm, and the high temperature resistivity of the proximal regions 204 and 202 is estimated to be about 0.55 ohm-cm. The room temperature resistivity of the distal regions 206 and 208 is estimate to be about 68 ohm-cm. The proximal region zone has a room temperature resistivity of about 0.50 ohm-cm.

The assembled igniter body 180 has a single point load of 5 to 10 pounds at failure, an impact test drop height (of a one pound weight) in excess of five inches, and a drop test drop height (of the igniter) of 8 to 24 inches. The terminal blocks 24 and 184 in FIGS. 2 and 13 are the same. Thus, Examples 1 and 2 demonstrate that the use of the two-leg form factor of FIG. 13 provides a stronger design than the serpentine form factor of Example 1.

COMPARATIVE EXAMPLE 1

An igniter body is prepared using the unsintered silicon carbide proximal and distal region compositions of Example 2 but with the sintering process of Example 1. The igniter body is formed as shown in FIG. 13. In Example 2, the introduction of nitrogen into the reducing atmosphere is delayed until the sintering furnace temperature reaches 2475° C. In contrast, in Example 1, nitrogen is introduced into the reducing atmosphere at 1100° C.

A resistance is measured across the igniter body between the proximal ends of the igniter, and a resistivity is calculated using an equation (2). The sintered igniter body has an overall room temperature resistivity of 0.53 ohm-cm and an overall high temperature resistivity (1000° C.) of 0.25 ohm-cm. The room temperature resistance of the entire igniter body is 25 ohms, and when a potential difference of 48 Volts is applied across the proximal ends of the igniter body, the current draw is 4.6 amps when the igniter body temperature reaches 1000° C. The resulting overall room temperature resistivity is 0.25 ohm-cm. The resulting overall high temperature resistivity of 0.25 ohm-cm of the igniter assembly is significantly lower than the corresponding value of 1.17 ohm-cm in Example 2 and is unsuitable for certain applications.

In one application, the igniter is expected to experience a nominal service voltage of 120V, a minimum service voltage of about 102V and a maximum service voltage of about 132V. The igniter is required to achieve a temperature (the ignition temperature of the gas to be ignited) of 1000° C. starting at room temperature within about 20-60 seconds at the minimum voltage of 102V and is required to achieve a stable temperature of less than 3000° C. at the maximum voltage of 132V. The minimum voltage temperature specification is provided to ensure that ignition will occur in a timely fashion, and the maximum voltage temperature specification is provided to avoid overheating and damaging the igniter. When the sintering process of Example 1 is used to form the two zone, two leg igniter of FIG. 13, the resulting 0.25 ohm-cm (high temperature resistivity) igniter overheats and cannot maintain a stable temperature of less than 3000° C. at the maximum voltage of 132V. However, when the process of Example 2 is used to form the two zone, two leg igniter of FIG. 13, the resulting 1.17 ohm-cm (high temperature resistivity) igniter reaches the ignition temperature in the required time frame at the minimum voltage of 102V and provides stable heating at a temperature below 3000° C. at the maximum voltage of 132V.

COMPARATIVE EXAMPLE 2

An igniter body is prepared using only the proximal region 202, 204 composition of Example 2 and is sintered using the sintering process of Example 2. The igniter body is formed into the shape of igniter body 182 of FIG. 13. The overall dimensions of the legs 192 and 194 of igniter body 182 are the same as in Example 2. The igniter body has an overall resistance of 27 ohms at room temperature. The room temperature resistivity is 0.53 ohm-cm, and the resistivity at 1200° C. is 0.25 ohm-cm. Thus, the overall electrical properties of the igniter with the conductive $MoSi_2$ material added throughout are equivalent to the electrical properties of the igniter body of Comparative Example 2, which is prepared by introducing nitrogen at 1100° C. When subjected to a service voltage of 72V, the igniter heats to a temperature of 1300° C. and draws a current of 5.6 amps. Thus, the igniter cannot maintain a stable temperature of less than 3000° C. at the maximum voltage of 132V.

Comparative examples 1 and 2 demonstrate how both adjusting the temperature at which nitrogen is introduced into the reducing atmosphere and adjusting the relative proportions of a proximal region containing a conductive material (such as a transition metal silicide) and a distal region that is devoid of the conductive material can be used to obtain desired electrical properties.

COMPARATIVE EXAMPLE 3

An igniter body is prepared using only the distal region 206, 208 composition of Example 2 and is sintered using the sintering process of Example 2. The igniter body is formed into the shape of igniter body 182 of FIG. 13. The overall dimensions of the legs overall dimensions of the legs 192 and 194 of the igniter body 182 are the same as in Example 2. The igniter body has a room temperature resistivity of 68 ohm-cm and a high temperature (1000° C.) resistivity of 2.14 ohm-cm. Because of the high room temperature resistivity, the igniter cannot reach its ignition temperature of 1000° C. in 20-60 seconds, and in fact, does not generate any heat even at the maximum expected service voltage of 120V. Thus, by including a zone that comprises a transition metal silicide ($MoSi_2$), the igniter prepared in accordance with Example 2 is able to reach the ignition temperature in the required time frame at the minimum expected service voltage of 102V.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of making a sintered hot surface igniter body, comprising: providing an unsintered, hot surface igniter body comprising silicon carbide, wherein the unsintered hot surface igniter body has a preen density of greater than 70 percent of a theoretical maximum density; sintering the unsintered hot surface igniter body in a reducing atmosphere comprising nitrogen in an amount ranging from 20 mole percent to 80 mole percent of the reducing atmosphere to yield a sintered hot surface igniter body, wherein the sintered hot surface igniter body has a post sintering density that differs from the green density by no more than five (5) percent, said sintering the unsintered hot surface igniter body in a reducing atmosphere comprises sintering the hot surface igniter body at one or more first sintering temperatures ranging from 2075° C. to 2425° C. for a first sintering period of from 20 minutes to 150 minutes, and said sintering the unsintered hot surface igniter body in the reducing atmosphere during the first sintering period further comprises (i) sintering the unsintered hot surface body igniter at a first sintering temperature of at least 2075° C. during a subperiod at east 40 minutes in the reducing atmosphere, and (ii) sintering the unsintered hot surface igniter body at a first sintering temperature of at least 2400° C. for a subperiod of at least about 15 minutes in the reducing atmosphere.

2. The method of claim 1, wherein the green density is less than 95 percent of the maximum theoretical density.

3. The method of claim 1, wherein the silicon carbide in the unsintered hot surface igniter body comprises a fines portion and a coarse portion, and the coarse portion comprises at least 20 percent by weight of the silicon carbide in the unsintered hot surface igniter body.

4. The method of claim 1, wherein the reducing atmosphere further comprises a noble gas.

5. The method of claim 1, wherein the step of sintering the unsintered hot surface igniter body in the reducing atmosphere further comprises sintering the unsintered hot surface igniter during a second sintering period at a second sintering temperature of at least 2500° C. for a subperiod of at least about 40 minutes.

6. The method of claim 1, wherein the unsintered hot surface igniter body is free of any densification aids selected from the group consisting of boron carbide, boron nitride, aluminum carbide, carbon, beryllium oxide, hafnium oxide, and yttrium oxide.

7. The method of claim 1, wherein the sintered hot surface igniter body has a nitrogen content of from 500 ppm to 1500 ppm by weight of the sintered hot surface igniter body.

8. The method of claim 1, wherein the amount of silicon carbide in the sintered hot surface igniter body is at least 99 percent by weight of the sintered hot surface igniter body.

9. The method of claim 1, wherein the sintered hot surface igniter body has a negative temperature coefficient.

10. The method of claim 1, wherein the sintered hot surface igniter body has a porosity greater than seven (7) percent.

11. The method of claim 1, wherein the sintered hot surface igniter body consists essentially of silicon carbide, aluminum, iron, and nitrogen.

12. The method of claim 3, wherein the coarse portion has a D50 particle size of from 50 microns to 300 microns.

13. The method of claim 3, wherein the fines portion has a D50 particle size of from 0.5 microns to 10 microns.

14. The method of claim 8, wherein sintered hot surface igniter body comprises at least 200 ppm aluminum by weight of the sintered hot surface igniter body.

15. The method of claim 13, wherein the fines portion has a surface area of greater than 1 $m^2/g$.

16. The method of claim 14, wherein the sintered hot surface igniter body comprises no more than 1000ppm of at least one transition metal by weight of the sintered hot surface igniter body.

17. A method of making a sintered hot surface igniter body, comprising: providing an unsintered hot surface igniter body comprising silicon carbide, wherein the silicon carbide comprises a fines portion and a coarse portion, and the coarse portion comprises at least 20 percent by weight of the silicon carbide in the unsintered hot surface igniter body, and the unsintered hot surface igniter body is free of any densification aids selected from the group consisting of boron carbide, boron nitride, aluminum carbide, carbon, beryllium oxide, hafnium oxide, and yttrium oxide; sintering the unsintered hot surface igniter body in a partially-nitrogenated reducing atmosphere at one or more first sintering temperatures ranging from 2075° C. to 2425° C. for a first sintering period of from 20 minutes to 150 minutes, wherein said sintering the unsintered hot surface igniter body for a first sintering period further comprises sintering the unsintered hot surface igniter body at a first sintering period temperature of at least 2075° C. during a first subperiod of at least 40 minutes in the partially-nitrogenated reducing atmosphere: and sintering the unsintered hot surface igniter body during a second sintering period at a second sintering temperature of at least 2500° C. for a subperiod of at least 40 minutes in the partially-nitrogenated reducing atmosphere.

18. The method of claim 17, wherein the sintered hot surface igniter body has a nitrogen content of from 500 ppm to 1500 ppm by weight of the sintered hot surface igniter body.

19. The method of claim 17, wherein the amount of silicon carbide in the sintered hot surface igniter body comprises at least 99 percent by weight of the first composition.

20. The method of claim 17, wherein sintered hot surface igniter body comprises at least 200 ppm aluminum by weight of the sintered hot surface igniter body.

21. The method of claim 17, wherein the sintered hot surface igniter body comprises no more than 1000 ppm of at least one transition metal by weight of the sintered hot surface igniter body.

22. The method of claim 17, wherein the sintered hot surface igniter body has a negative temperature coefficient.

23. The method of claim 17, wherein the sintered hot surface igniter body has a porosity greater than seven (7) percent.

24. The method of claim 17, wherein the sintered hot surface igniter body consists essentially of silicon carbide, aluminum, iron, and nitrogen.

25. The method of claim 17, wherein the unsintered hot surface igniter body has a green density of greater than 70 percent of a theoretical maximum density.

26. The method of claim 17, wherein the unsintered hot surface igniter body has a green density, and the sintered hot surface igniter body has a density that differs from the green density by no more than five (5) percent.

27. A method of making a sintered hot surface igniter body, comprising:
providing an unsintered hot surface igniter body comprising a proximal region adjacent a distal region along a length axis, wherein the proximal region and the distal region comprise silicon carbide;
sintering the unsintered hot surface igniter body to yield a sintered hot surface igniter body, wherein the sintering step comprises:
sintering the unsintered hot surface igniter body in a first reducing atmosphere at a first sintering temperature for a first sintering period, wherein the first reducing atmosphere is substantially devoid of nitrogen, and the first sintering period is at least 15 minutes; and
sintering the unsintered hot surface igniter body in a second reducing atmosphere at a second sintering temperature for a second sintering period, wherein the second reducing atmosphere is partially-nitrogenated, and the second sintering temperature is at least 2400° C. during the second sintering period, the proximal region of the unsintered hot surface igniter body further comprises at least one transition metal silicide, the distal region of the unsintered hot surface igniter body is devoid of transition metal silicides, and the amount of the at least one transition metal silicide in the proximal region is from two percent to twenty percent by weight of the proximal region of the unsintered hot surface igniter body.

28. The method of claim 27, wherein during the first sintering period the first sintering temperature is at least 2000° C. during a subperiod of at least 30 minutes.

29. The method of claim 28, wherein during the first sintering period, the first sintering temperature is no greater than 2525° C.

30. The method of claim 27, wherein the second sintering period is at least 10 minutes.

31. The method of claim 27, wherein the sintering step further comprises sintering the unsintered hot surface igniter body during a third sintering period in the partially-nitrogenated second reducing atmosphere, wherein the third sintering temperature is at least 2500° C. during a subperiod of at least 40 minutes within the third sintering period.

32. The method of claim 27, wherein the first reducing atmosphere comprises a noble gas, and the second partially-nitrogenated reducing atmosphere comprises the noble gas.

33. The method of claim 27, wherein the silicon carbide in the distal region of the unsintered hot surface igniter body comprises a fines portion and a coarse portion, and the coarse portion comprises at least 20 percent by weight of the silicon carbide in the distal region.

34. The method of claim 27, wherein the distal region of the sintered hot surface igniter body consists essentially of silicon carbide, aluminum, and nitrogen.

35. The method of claim 27, wherein the partially-nitrogenated second reducing atmosphere comprises at least 10 mole percent nitrogen and no more than 80 mole percent nitrogen based on the total composition of the second reducing atmosphere.

36. The method of claim 27, wherein the distal region has a high temperature resistivity at 1000° C. of from 0.8 ohm-cm to 3.5 ohm-cm.

37. The method of claim 33, wherein the coarse portion has a D50 particle size of from 50 microns to 300 microns.

38. The method of claim 34, wherein the proximal region of the hot surface igniter body consists essentially of silicon carbide, nitrogen, and at least one transition metal silicide or transition metal silicide former.

39. The method of claim 35, wherein the partially-nitrogenated second reducing atmosphere consists essentially of nitrogen and argon.

40. The method of claim 36, wherein the distal region has a room temperature resistivity of at least about 3 ohm-cm.

* * * * *

(12) EX PARTE REEXAMINATION CERTIFICATE (11987th)
United States Patent
Willkens et al.

(10) Number: US 9,951,952 C1
(45) Certificate Issued: Jan. 21, 2022

(54) HOT SURFACE IGNITERS AND METHODS OF MAKING SAME

(71) Applicant: Specialized Component Parts Limited, Inc., Auburn, IN (US)

(72) Inventors: Craig Andrew Willkens, Auburn, IN (US); Frederick Taylor Fernandez, Fort Wayne, IN (US)

(73) Assignee: SPECIALIZED COMPONENT PARTS LIMITED, INC., Auburn, IN (US)

Reexamination Request:
No. 90/014,626, Dec. 10, 2020

Reexamination Certificate for:
Patent No.: 9,951,952
Issued: Apr. 24, 2018
Appl. No.: 14/514,506
Filed: Oct. 15, 2014

(51) Int. Cl.
*F23Q 7/00* (2006.01)
*C04B 35/573* (2006.01)
*C04B 35/64* (2006.01)
*F27D 7/06* (2006.01)
*F27D 19/00* (2006.01)
*H01C 17/065* (2006.01)

(52) U.S. Cl.
CPC ............ *F23Q 7/001* (2013.01); *C04B 35/573* (2013.01); *C04B 35/64* (2013.01); *F23Q 7/00* (2013.01); *F27D 7/06* (2013.01); *F27D 19/00* (2013.01); *C04B 2235/3217* (2013.01); *C04B 2235/3272* (2013.01); *C04B 2235/3826* (2013.01); *C04B 2235/5436* (2013.01); *C04B 2235/5472* (2013.01); *C04B 2235/608* (2013.01); *C04B 2235/652* (2013.01); *C04B 2235/658* (2013.01); *C04B 2235/6562* (2013.01); *C04B 2235/6565* (2013.01); *C04B 2235/6567* (2013.01); *C04B 2235/661* (2013.01); *C04B 2235/72* (2013.01); *C04B 2235/722* (2013.01); *C04B 2235/75* (2013.01); *C04B 2235/94* (2013.01); *F23Q 2007/004* (2013.01); *F27D 2007/063* (2013.01); *F27D 2019/0003* (2013.01); *F27D 2019/0006* (2013.01); *H01C 17/0652* (2013.01); *H01C 17/06533* (2013.01)

(58) Field of Classification Search
None
See application file for complete search history.

(56) References Cited

To view the complete listing of prior art documents cited during the proceeding for Reexamination Control Number 90/014,626, please refer to the USPTO's public Patent Application Information Retrieval (PAIR) system under the Display References tab.

*Primary Examiner* — Sean E Vincent

(57) ABSTRACT

A method of making a hot surface igniter is described. A silicon carbide composition that includes both fines fraction and a coarse fraction is sintered in a nitrogen and argon reducing atmosphere in a manner that controls the incorporation of nitrogen with in the lattice of recrystallized silicon carbide. The controlled incorporation of nitrogen in the lattice provides enhanced control over heating and electrical properties, while simultaneously achieving a lower surface area fully recrystallized structure for oxidation resistance and long service life.

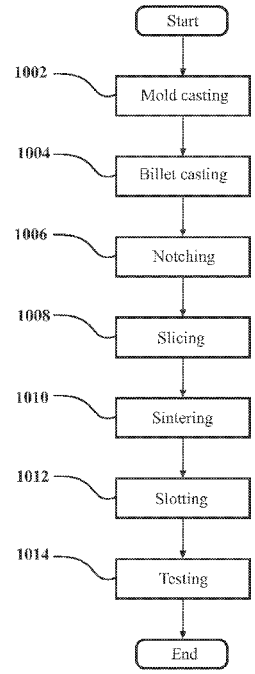

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 16 are determined to be patentable as amended.

Claims 2, 3 and 6-15, dependent on an amended claim, are determined to be patentable.

Claims 4 and 17-40 were not reexamined.

1. A method of making a sintered hot surface igniter body, comprising:
providing an unsintered, hot surface igniter body comprising silicon carbide, wherein the unsintered hot surface igniter body has a [preen] *green* density of greater than 70 percent of a theoretical maximum density;
sintering the unsintered hot surface igniter body in a reducing atmosphere comprising nitrogen in an amount ranging from 20 mole percent to 80 mole percent of the reducing atmosphere to yield a sintered hot surface igniter body, wherein the sintered hot surface igniter body has a post sintering density that differs from the green density by no more than five (5) percent, said sintering the unsintered hot surface igniter body in a reducing atmosphere comprises sintering the hot surface igniter body at one or more first sintering temperatures ranging from 2075° C. to 2425° C. for a first sintering period of from 20 minutes to 150 minutes, and said sintering the unsintered hot surface igniter body in the reducing atmosphere during the first sintering period further comprises (i) sintering the unsintered hot surface body igniter at a first sintering temperature of at least 2075° C. during a subperiod *of* at [east] *least* 40 minutes in the reducing atmosphere, and (ii) sintering the unsintered hot surface igniter body at a first sintering temperature of at least 2400° C. for a subperiod of at least [about] 15 minutes in the reducing atmosphere.

16. The method of claim 14, wherein the sintered hot surface igniter body comprises [no more] *at least one transition metal, and the at least one transition metal is present in amount no greater* than 1000ppm [of at least one transition metal] by weight of the sintered hot surface igniter body.

* * * * *